US012610002B2

(12) United States Patent (10) Patent No.: US 12,610,002 B2

Hu et al. (45) Date of Patent: Apr. 21, 2026

(54) BUTTON CONTROL METHOD FOR ELECTRONIC DEVICE AND ELECTRONIC DEVICE

(71) Applicant: Huawei Technologies Co., Ltd., Shenzhen (CN)

(72) Inventors: Kai Hu, Shenzhen (CN); Yuxi Zhang, Shanghai (CN); Zhongbiao Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 276 days.

(21) Appl. No.: 18/579,675

(22) PCT Filed: Jul. 1, 2022

(86) PCT No.: PCT/CN2022/103407

§ 371 (c)(1),
(2) Date: Jan. 16, 2024

(87) PCT Pub. No.: WO2023/284568

PCT Pub. Date: Jan. 19, 2023

(65) Prior Publication Data

US 2024/0333825 A1 Oct. 3, 2024

(30) Foreign Application Priority Data

Jul. 16, 2021 (CN) .......................... 202110808766.2

(51) Int. Cl.
H04M 1/02 (2006.01)
G06F 1/16 (2006.01)
(Continued)

(52) U.S. Cl.
CPC ........ *H04M 1/0245* (2013.01); *G06F 1/1647* (2013.01); *G06F 1/1652* (2013.01);
(Continued)

(58) Field of Classification Search
CPC .... G06F 3/0346; G06F 1/1641; G06F 1/1652; G06F 1/1671; G06F 1/1677; H04M 1/0214; H04M 1/72466; H04M 1/0245
See application file for complete search history.

(56) References Cited

U.S. PATENT DOCUMENTS 10,409,413 B2 * 9/2019 Teoh ...................... G06F 1/1632
11,064,060 B2 * 7/2021 Jang ...................... G06F 1/1643
(Continued)

FOREIGN PATENT DOCUMENTS

CN 108777731 A 11/2018
CN 110058686 A 7/2019
(Continued)

*Primary Examiner* — Patrick F Marinelli
(74) *Attorney, Agent, or Firm* — Conley Rose, P.C.

(57) ABSTRACT

An electronic device includes a display screen and at least one button. The display screen is a foldable screen. In a process in which a user uses the electronic device, a function that needs to be responded to by a button on the electronic device may be adaptively adjusted based on a physical form of the foldable screen of the electronic device, so that a button function that conforms to a using habit of the user can still be provided when the foldable screen of the electronic device is in a different physical form.

18 Claims, 17 Drawing Sheets

(51) Int. Cl.
    *G06F 3/0346*       (2013.01)
    *H04M 1/23*         (2006.01)
    *H04M 1/72466*    (2021.01)

(52) U.S. Cl.
    CPC .......... *G06F 1/1677* (2013.01); *G06F 3/0346*
        (2013.01); *H04M 1/0216* (2013.01); *H04M*
        *1/0268* (2013.01); *H04M 1/236* (2013.01);
        *H04M 1/72466* (2021.01); *G06F 2203/04102*
        (2013.01)

(56)           References Cited

U.S. PATENT DOCUMENTS

| | | | |
|---|---|---|---|
| 2007/0004451 A1 * | 1/2007 | C. Anderson | G06F 1/1626 |
| | | | 455/556.1 |
| 2017/0052698 A1 * | 2/2017 | Seo | G06F 3/0483 |
| 2018/0121008 A1 * | 5/2018 | Teoh | G06F 1/1632 |
| 2018/0359350 A1 * | 12/2018 | Kim | H04M 1/72403 |
| 2021/0152678 A1 * | 5/2021 | Jang | H04M 1/0214 |
| 2024/0333825 A1 * | 10/2024 | Hu | G06F 1/1694 |

FOREIGN PATENT DOCUMENTS

| | | | | |
|---|---|---|---|---|
| CN | 110456864 A | * 11/2019 | | G06F 9/4411 |
| CN | 112486346 A | 3/2021 | | |
| CN | 114661177 A | 6/2022 | | |
| KR | 20130139048 A | * 12/2013 | | G06F 1/1694 |

* cited by examiner

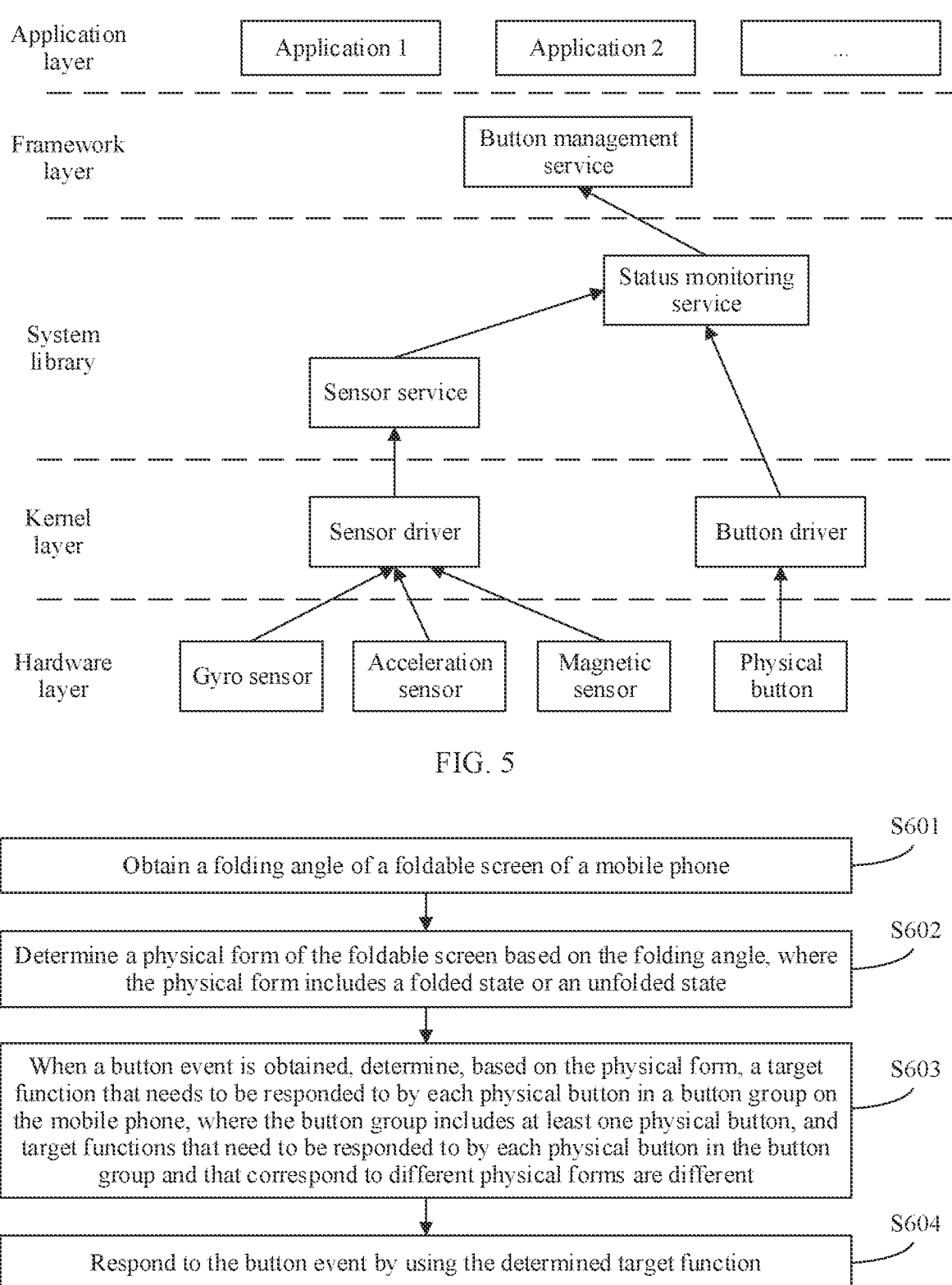

Obtain a folding angle of a foldable screen of a mobile phone

S602

Determine a physical form of the foldable screen based on the folding angle, where the physical form includes a folded state or an unfolded state

S603

When a button event is obtained, determine, based on the physical form, a target function that needs to be responded to by each physical button in a button group on the mobile phone, where the button group includes at least one physical button, and target functions that need to be responded to by each physical button in the button group and that correspond to different physical forms are different

S604

Respond to the button event by using the determined target function

FIG. 6

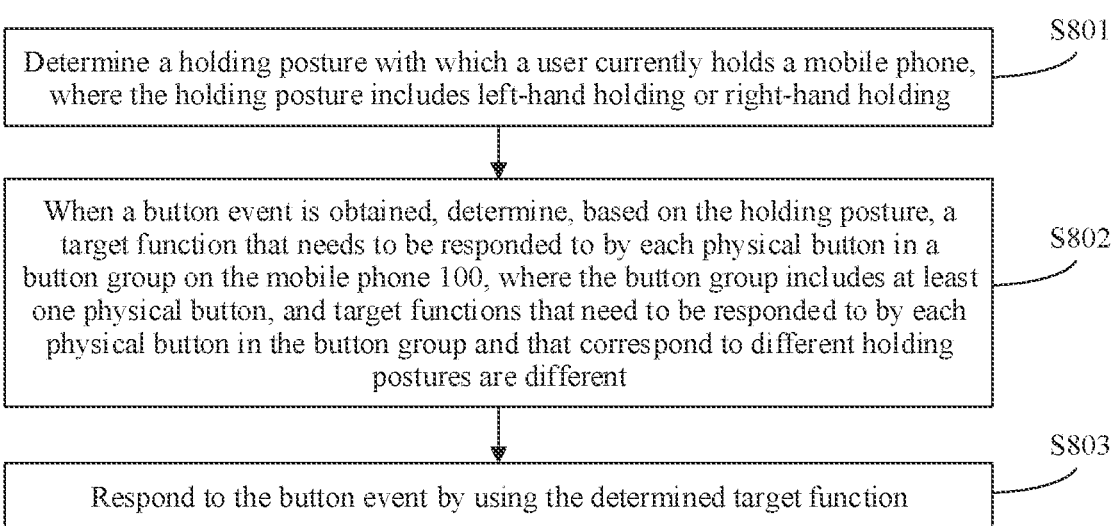

Determine a holding posture with which a user currently holds a mobile phone, where the holding posture includes left-hand holding or right-hand holding    S801

When a button event is obtained, determine, based on the holding posture, a target function that needs to be responded to by each physical button in a button group on the mobile phone 100, where the button group includes at least one physical button, and target functions that need to be responded to by each physical button in the button group and that correspond to different holding postures are different    S802

Respond to the button event by using the determined target function    S803

FIG. 8

FIG. 9

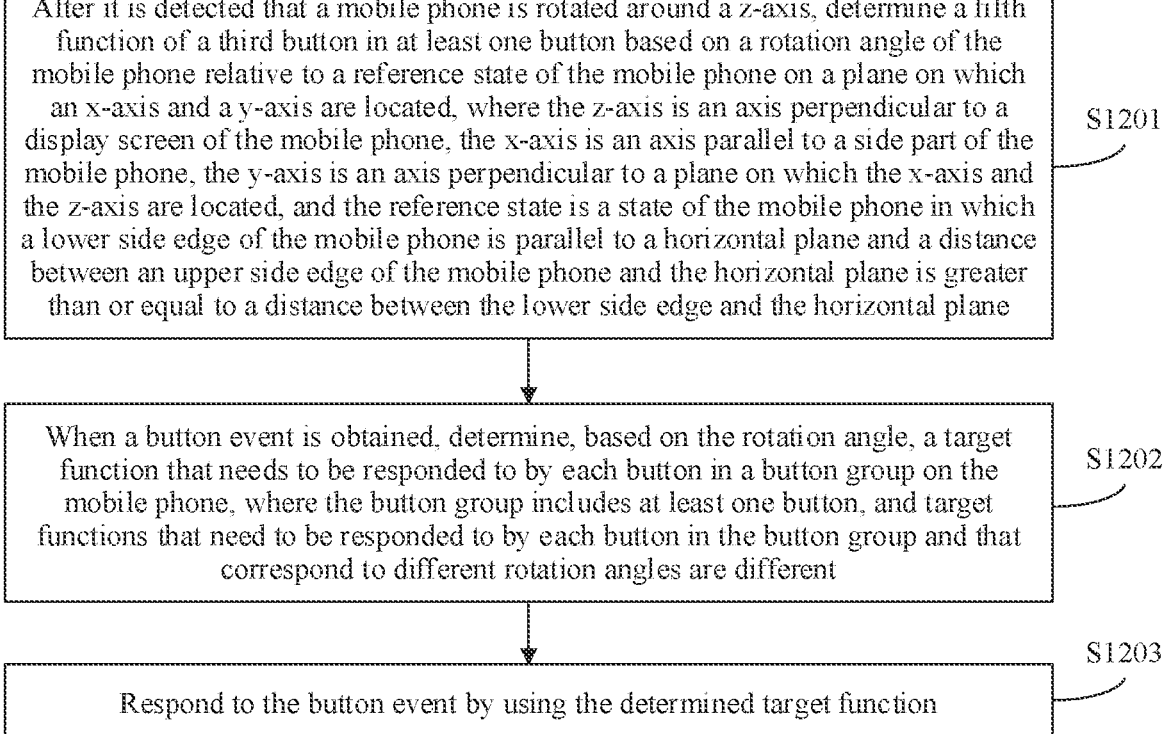

After it is detected that a mobile phone is rotated around a z-axis, determine a fifth function of a third button in at least one button based on a rotation angle of the mobile phone relative to a reference state of the mobile phone on a plane on which an x-axis and a y-axis are located, where the z-axis is an axis perpendicular to a display screen of the mobile phone, the x-axis is an axis parallel to a side part of the mobile phone, the y-axis is an axis perpendicular to a plane on which the x-axis and the z-axis are located, and the reference state is a state of the mobile phone in which a lower side edge of the mobile phone is parallel to a horizontal plane and a distance between an upper side edge of the mobile phone and the horizontal plane is greater than or equal to a distance between the lower side edge and the horizontal plane

S1201

When a button event is obtained, determine, based on the rotation angle, a target function that needs to be responded to by each button in a button group on the mobile phone, where the button group includes at least one button, and target functions that need to be responded to by each button in the button group and that correspond to different rotation angles are different

S1202

S1203

Respond to the button event by using the determined target function

FIG. 12

CONT.
FROM

Rotate by 90 degrees

TO

CONT FROM FIG. 13(C)

0 k/s 12% 12:00

12:00
Month & Date

Clock  Gallery  Weather  Calculator

Camera  Email  AppGallery  Settings

235

236

Rotate by 90 degrees

100

TO

BUTTON CONTROL METHOD FOR ELECTRONIC DEVICE AND ELECTRONIC DEVICE

CROSS-REFERENCE TO RELATED APPLICATIONS

This is a National Stage of International Patent Application No. PCT/CN2022/103407 filed on Jul. 1, 2022, which claims priority to Chinese Patent Application No. 202110808766.2 filed on Jul. 16, 2021, both of which are hereby incorporated by reference in their entireties.

TECHNICAL FIELD

This application relates to the field of terminal technologies, and in particular, to a button control method for an electronic device and an electronic device.

BACKGROUND

With development of electronic technologies, a form of a display screen of an electronic device (for example, a mobile phone) varies greatly, and a form of the electronic device (for example, the mobile phone) also becomes diversified. In some use scenarios, an originally used button of an electronic device (for example, a mobile phone) does not conform to a normal using habit because a form of the electronic device (for example, the mobile phone) is changed or because a user holds the electronic device differently, and this affects use experience of the user.

SUMMARY

To achieve the foregoing technical objective, this application provides a button control method for an electronic device, an electronic device, a computer storage medium, and a computer program product, which can adaptively adjust a function of a button on the electronic device, so that the button on the electronic device may conform to a using habit of a user, thereby improving user experience.

According to a first aspect, this application provides a button control method for an electronic device. The electronic device may include a display screen and at least one button, the display screen may be a foldable screen, a physical form of the foldable screen may include a folded state and an unfolded state, and the at least one button includes a first button. A function of the first button is a first function when the physical form of the foldable screen is the folded state, or a function of the first button is a second function when the physical form of the foldable screen is the unfolded state. The method may include: when the physical form is the folded state, outputting the first function if the first button is triggered; or when the physical form is the unfolded state, outputting the second function if the first button is triggered. In this way, in a process in which a user uses the electronic device, a function that needs to be responded to by a button on the electronic device may be adaptively adjusted based on the physical form of the foldable screen of the electronic device, so that a button function that conforms to a using habit of the user can still be provided when the foldable screen of the electronic device is in a different physical form. This avoids a problem that a function of the button on the electronic device is not consistent with a normal use function when the foldable screen of the electronic device is in a different physical form, and improves user experience.

According to the first aspect, the at least one button further includes a second button. A function of the second button is a third function when the physical form of the foldable screen is the folded state, or a function of the second button is a fourth function when the physical form of the foldable screen is the unfolded state. The first function is the same as the fourth function, and the second function is the same as the third function. In this way, when the electronic device includes two buttons, functions of the two buttons may be replaced with each other when the foldable screen of the electronic device is in a different state, to provide button functions that conform to a using habit of the user, thereby improving user experience.

According to any one of the first aspect or the foregoing implementations of the first aspect, the foldable screen of the electronic device includes an inner screen and an outer screen, the inner screen includes a first screen and a second screen, the outer screen is located on a first body of the electronic device, the first screen is located on the first body, and the second screen is located on a second body of the electronic device. Both the first button and the second button are disposed on the first body. In this way, the two buttons are disposed on a same body, so that button functions that conform to a user habit can still be provided when the physical form of the foldable screen is changed.

According to any one of the first aspect or the foregoing implementations of the first aspect, both the first button and the second button are located on a first side of the first body. In this way, the two buttons are disposed on a same side of the electronic device, so as to facilitate a user operation and improve user operation experience.

According to any one of the first aspect or the foregoing implementations of the first aspect, when the physical form is the folded state, the function of the first button is power-on/off, and the function of the second button is volume adjustment; or when the physical form is the unfolded state, the function of the first button is volume adjustment, and the function of the second button is power-on/off.

According to any one of the first aspect or the foregoing implementations of the first aspect, the method may further include: obtaining a folding angle of the foldable screen; and determining the physical form based on the folding angle. In this way, the physical form of the foldable screen can be learned of by using the folding angle of the foldable screen.

According to any one of the first aspect or the foregoing implementations of the first aspect, the determining the physical form based on the folding angle may specifically include: when the folding angle is greater than a preset angle, determining that the physical form is the unfolded state; or when the folding angle is less than or equal to a preset angle, determining that the physical form is the folded state. In this way, the physical form of the foldable screen may be determined based on the folding angle and the preset angle.

According to any one of the first aspect or the foregoing implementations of the first aspect, the method may further include: after it is detected that the electronic device is rotated around a z-axis, determining a fifth function of a third button in the at least one button based on a rotation angle of the electronic device relative to a reference state of the electronic device on a plane on which an x-axis and a y-axis are located, where the z-axis is an axis perpendicular to the display screen of the electronic device, the x-axis is an axis parallel to a side part of the electronic device, the y-axis is an axis perpendicular to a plane on which the x-axis and the z-axis are located, and the reference state is a state of the electronic device in which a lower side edge of the electronic device is parallel to a horizontal plane and a distance between an upper side edge of the electronic device and the horizontal plane is greater than or equal to a distance between the lower side edge and the horizontal plane; and outputting the fifth function when the third button is triggered. In this way, when the electronic device is rotated, a function that needs to be responded to by each button in a button group on the electronic device may be adaptively adjusted based on the rotation angle of the electronic device, so that a button function that conforms to a using habit of the user can still be provided when the electronic device is rotated, thereby improving user experience.

According to any one of the first aspect or the foregoing implementations of the first aspect, the third button is the same as the first button, and the fifth function is the same as the first function or the second function.

According to any one of the first aspect or the foregoing implementations of the first aspect, a holding posture with which the electronic device is held includes left-hand holding or right-hand holding, and a function of a fourth button in the at least one button when the holding posture is left-hand holding is a sixth function, or a function of a fourth button when the holding posture is right-hand holding is a seventh function. The method may further include: when the holding posture is left-hand holding, outputting the sixth function if the fourth button is triggered; or when the holding posture is right-hand holding, outputting the seventh function if the fourth button is triggered. In this way, when the posture with which the user holds the electronic device changes, a function that needs to be responded to by each button in the button group on the electronic device may be adaptively adjusted based on the current holding posture with which the user holds the electronic device, so that a button function that conforms to a using habit of the user can still be provided when the holding posture with which the user holds the electronic device occurs. This avoids a problem that a function of a button on the electronic device is not consistent with a normal use function when the holding posture with which the user holds the electronic device occurs, and improves user experience.

According to any one of the first aspect or the foregoing implementations of the first aspect, the fourth button is the same as the first button.

According to any one of the first aspect or the foregoing implementations of the first aspect, the sixth function is the same as the first function or the second function, and the seventh function is the same as the first function or the second function, where the sixth function is different from the seventh function.

According to a second aspect, this application provides a button control method for an electronic device. The electronic device may include a display screen and at least one button, and the at least one button includes a third button. The method may include: after it is detected that the electronic device is rotated around a z-axis, determining, based on a rotation angle of the electronic device relative to a reference state of the electronic device on a plane on which an x-axis and a y-axis are located, a fifth function that needs to be responded to by the third button, where the z-axis is an axis perpendicular to the display screen of the electronic device, the x-axis is an axis parallel to a side part of the electronic device, the y-axis is an axis perpendicular to a plane on which the x-axis and the z-axis are located, and the reference state is a state of the electronic device in which a lower side edge of the electronic device is parallel to a horizontal plane and a distance between an upper side edge of the electronic device and the horizontal plane is greater than or equal to a distance between the lower side edge and the horizontal plane; and outputting the fifth function when the third button is triggered. In this way, when the electronic device is rotated, a function that needs to be responded to by each button in a button group on the electronic device may be adaptively adjusted based on the rotation angle of the electronic device, so that a button function that conforms to a using habit of a user can still be provided when the electronic device is rotated, thereby improving user experience.

According to a third aspect, this application provides a button control method for an electronic device. The electronic device may include a display screen and at least one button, the at least one button includes a fourth button, and a holding posture with which the electronic device is held includes left-hand holding or right-hand holding. A function of the fourth button is a sixth function when the holding posture is left-hand holding, or a function of the fourth button is a seventh function when the holding posture is right-hand holding. The method may include: when the holding posture is left-hand holding, outputting the sixth function if the fourth button is triggered; or when the holding posture is right-hand holding, outputting the seventh function if the fourth button is triggered. In this way, when the posture with which a user holds the electronic device changes, a function that needs to be responded to by each button in a button group on the electronic device may be adaptively adjusted based on the current holding posture with which the user holds the electronic device, so that a button function that conforms to a using habit of the user can still be provided when the holding posture with which the user holds the electronic device occurs. This avoids a problem that a function of a button on the electronic device is not consistent with a normal use function when the holding posture with which the user holds the electronic device occurs, and improves user experience.

According to a fourth aspect, this application provides an electronic device, including:

at least one button;

a display screen, where the display screen is a foldable screen;

at least one memory, configured to store a program; and at least one processor, configured to execute the program stored in the memory. When the program stored in the memory is executed, the processor is configured to perform any one of the first aspect or the implementations of the first aspect, or perform any one of the second aspect or the implementations of the second aspect, or perform any one of the third aspect or the implementations of the third aspect.

The fourth aspect and any implementation of the fourth aspect respectively correspond to the first aspect and any implementation of the first aspect, or correspond to the second aspect and any implementation of the second aspect, or correspond to the third aspect and any implementation of the third aspect. For technical effects corresponding to any one of the second aspect or the implementations of the second aspect, refer to technical effects corresponding to any one of the first aspect or the implementations of the first aspect, or any one of the second aspect or the implementations of the second aspect, or any one of the third aspect or the implementations of the third aspect. Details are not described herein again.

According to a fifth aspect, this application provides a computer-readable storage medium. The computer-readable storage medium stores a computer program. When the computer program is run on an electronic device, the electronic device is enabled to perform any one of the first aspect or the implementations of the first aspect, or perform any one of the second aspect or the implementations of the second aspect, or perform any one of the third aspect or the implementations of the third aspect.

The fifth aspect and any implementation of the fifth aspect respectively correspond to the first aspect and any implementation of the first aspect, or correspond to the second aspect and any implementation of the second aspect, or correspond to the third aspect and any implementation of the third aspect. For technical effects corresponding to any one of the fifth aspect or the implementations of the fifth aspect, refer to technical effects corresponding to any one of the first aspect or the implementations of the first aspect, or any one of the second aspect or the implementations of the second aspect, or any one of the third aspect or the implementations of the third aspect. Details are not described herein again.

According to a sixth aspect, this application provides a computer program product. When the computer program product is run on an electronic device, the electronic device is enabled to perform any one of the first aspect or the implementations of the first aspect, or perform any one of the second aspect or the implementations of the second aspect, or perform any one of the third aspect or the implementations of the third aspect.

The sixth aspect and any implementation of the sixth aspect respectively correspond to the first aspect and any implementation of the first aspect, or correspond to the second aspect and any implementation of the second aspect, or correspond to the third aspect and any implementation of the third aspect. For technical effects corresponding to any one of the sixth aspect or the implementations of the sixth aspect, refer to technical effects corresponding to any one of the first aspect or the implementations of the first aspect, any one of the second aspect or the implementations of the second aspect, or any one of the third aspect or the implementations of the third aspect. Details are not described herein again.

BRIEF DESCRIPTION OF DRAWINGS

The following briefly describes the accompanying drawings that need to be used in the descriptions of embodiments or a conventional technology.

FIG. 5 is a schematic diagram of an architecture of an operating system of a mobile phone according to an embodiment of this application;

FIG. 6 is a schematic flowchart of a button control method for a mobile phone according to an embodiment of this application;

FIG. 8 is a schematic flowchart of a button control method for a mobile phone according to an embodiment of this application:

FIG. 9 is a schematic diagram of button arrangement on a mobile phone according to an embodiment of this application;

FIG. 12 is a schematic flowchart of a button control method for a mobile phone according to an embodiment of this application;

DESCRIPTION OF EMBODIMENTS

Figure 1:
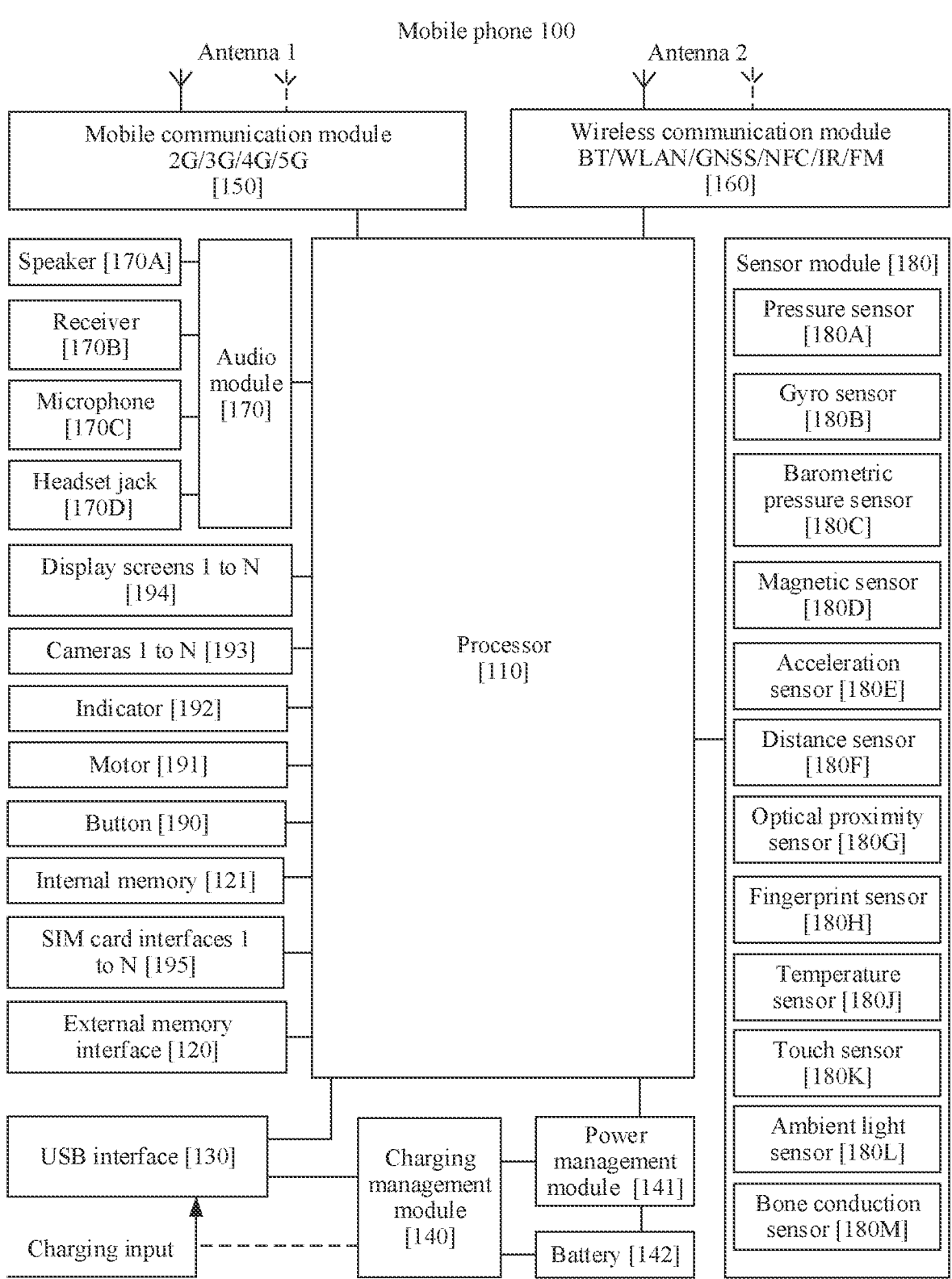
FIG. 1 is a schematic diagram of a hardware structure of a mobile phone according to an embodiment of this application.

Terms used in the following embodiments are merely intended to describe particular embodiments, but are not intended to limit this application. As used in the specification and appended claims of this application, singular expressions "one", "a", "the", "the foregoing", "this", and "the one" are also intended to include expressions such as "one or more", unless the contrary is clearly indicated in the context. It should be further understood that in the following embodiments of this application, "at least one" and "one or more" mean one or at least two (including two). The term "and/or" is used to describe an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects.

Reference to "an embodiment", "some embodiments", or the like described in this specification indicates that one or more embodiments of this application include a specific feature, structure, or characteristic described with reference to embodiments. Therefore, statements such as "in an embodiment", "in some embodiments". "in some other embodiments", and "in other embodiments" that appear at different places in this specification do not necessarily mean reference to a same embodiment. Instead, the statements mean "one or more but not all of embodiments", unless otherwise specifically emphasized in another manner. The terms "include", "comprise". "have", and their variants all mean "include but are not limited to", unless otherwise specifically emphasized in another manner. The term "connection" includes direct connection and indirect connection, unless otherwise specified.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features.

In embodiments of this application, the word "example", "for example", or the like is used to represent giving an example, an illustration, or a description. Any embodiment or design scheme described as "example" or "for example"

in embodiments of this application should not be explained as being more preferred or having more advantages than another embodiment or design scheme. Exactly, use of the term "example", "for example", or the like is intended to present a relative concept in a specific manner.

An embodiment of this application provides a button control method for an electronic device, and the method may be applied to an electronic device having a foldable screen, such as a mobile phone or a tablet computer. This is not limited in this embodiment of this application. According to the method, a function of a button on the electronic device may be adaptively adjusted based on a form of the foldable screen, so that the function of the button on the electronic device may be dynamically adjusted based on the form of the foldable screen, thereby meeting user requirements in different scenarios and improving user experience.

For example, a mobile phone is used as the foregoing electronic device. FIG. 1 is a schematic diagram of a structure of a mobile phone. As shown in FIG. 1, a mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of the present invention does not constitute a specific limitation on the mobile phone 100. In some other embodiments of this application, the mobile phone 100 may include more or fewer components than those shown in the figure, some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache. The memory may store instructions or data that is just used or cyclically used by the processor 110. If the processor 110 needs to use the instructions or data again, the processor may directly invoke the instructions or data from the memory. This avoids repeated access and reduces a waiting time of the processor 110, so that system efficiency is improved.

The USB interface 130 is an interface conforming to the USB standard specification, and specifically, may be a Mini USB interface, a Micro USB interface, a USB Type C interface, or the like. The USB interface 130 may be configured to connect to a charger to charge the mobile phone 100, or may be configured to perform data transmission between the mobile phone 100 and a peripheral device. The USB interface may also be configured to connect to earphones and play audio through the earphones. The interface may alternatively be configured to connect to another mobile phone 100, for example, an AR device.

The charging management module 140 is configured to receive a charging input from the charger. The charger may be a wireless charger or a wired charger. In some embodiments of wired charging, the charging management module 140 may receive a charging input of the wired charger through the USB interface 130. In some embodiments of wireless charging, the charging management module 140 may receive a wireless charging input by using a wireless charging coil of the mobile phone 100. The charging management module 140 supplies power to the mobile phone 100 by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display screen 194, the camera 193, the wireless communication module 160, and the like. The power management module 141 may be further configured to monitor parameters such as a battery capacity, a battery cycle count, and a battery health status (electricity leakage or impedance). In some other embodiments, the power management module 141 may alternatively be disposed in the processor 110. In some other embodiments, the power management module 141 and the charging management module 140 may alternatively be disposed in a same device.

A wireless communication function of the mobile phone 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the mobile phone 100 may be configured to cover one or more communication frequency bands. Different antennas may be further reused to improve antenna utilization. For example, the antenna 1 may be reused as a diversity antenna in a wireless local area network. In some other embodiments, an antenna may be used in combination with a tuning switch.

The mobile communication module 150 may provide a solution, applied to the mobile phone 100, to wireless communication including 2G, 3G, 4G, 5G, and the like. The mobile communication module 150 may include at least one filter, switch, power amplifier, low noise amplifier (low noise amplifier, LNA), and the like. The mobile communication module 150 may receive an electromagnetic wave through the antenna 1, perform filtering, amplification, and other processing on the received electromagnetic wave, and then transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same component.

The modem processor may include a modulator and a demodulator. The modulator is configured to modulate a low-frequency baseband signal to be transmitted into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is transferred to the application processor after being processed by the baseband processor. The application processor outputs a sound signal through an audio device (not limited to the speaker 170A, the receiver 170B, and the like), or displays an image or a video through the display screen 194. In some embodiments, the modem processor may be an independent component. In some other embodiments, the modem processor may be independent of the processor 110, and may be disposed in the same component as the mobile communication module 150 or another functional module.

The wireless communication module 160 may provide a solution to wireless communication applied to the mobile phone 100, for example, a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2. For example, the mobile phone 100 may send location information, for example, location information of the mobile phone 100 and/or location information stored in the mobile phone 100, to another mobile phone 100 by using the wireless communication module 160, or may receive, by using the wireless communication module 160, location information sent by another mobile phone 100.

The mobile phone 100 implements a display function by using the GPU, the display screen 194, the application processor, and the like. The GPU is a microprocessor for image processing, and is connected to the display screen 194 and the application processor. The GPU is configured to perform mathematical and geometric computation for graphic rendering. The processor 110 may include one or more GPUs that execute program instructions to generate or change display information.

Figure 2A:
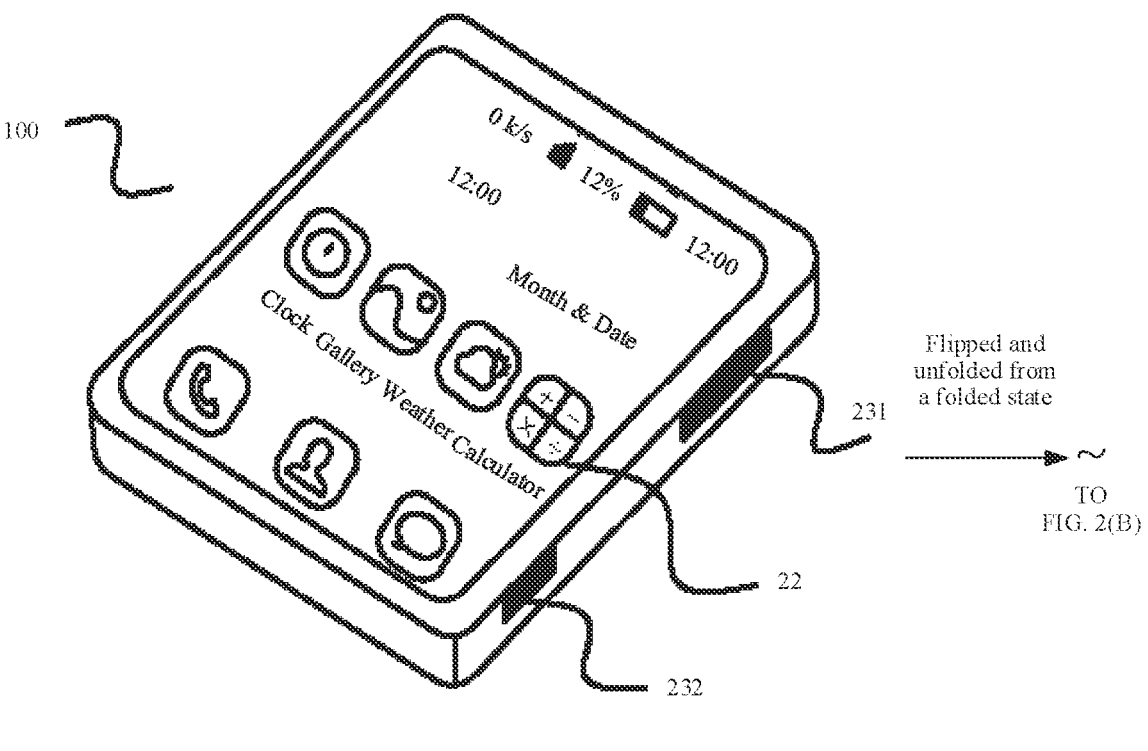
FIG. 2(A) to FIG. 2(C) are a schematic diagram of a process in which a foldable screen of a mobile phone is changed from a folded state to an unfolded state according to an embodiment of this application.
Figure 2B:
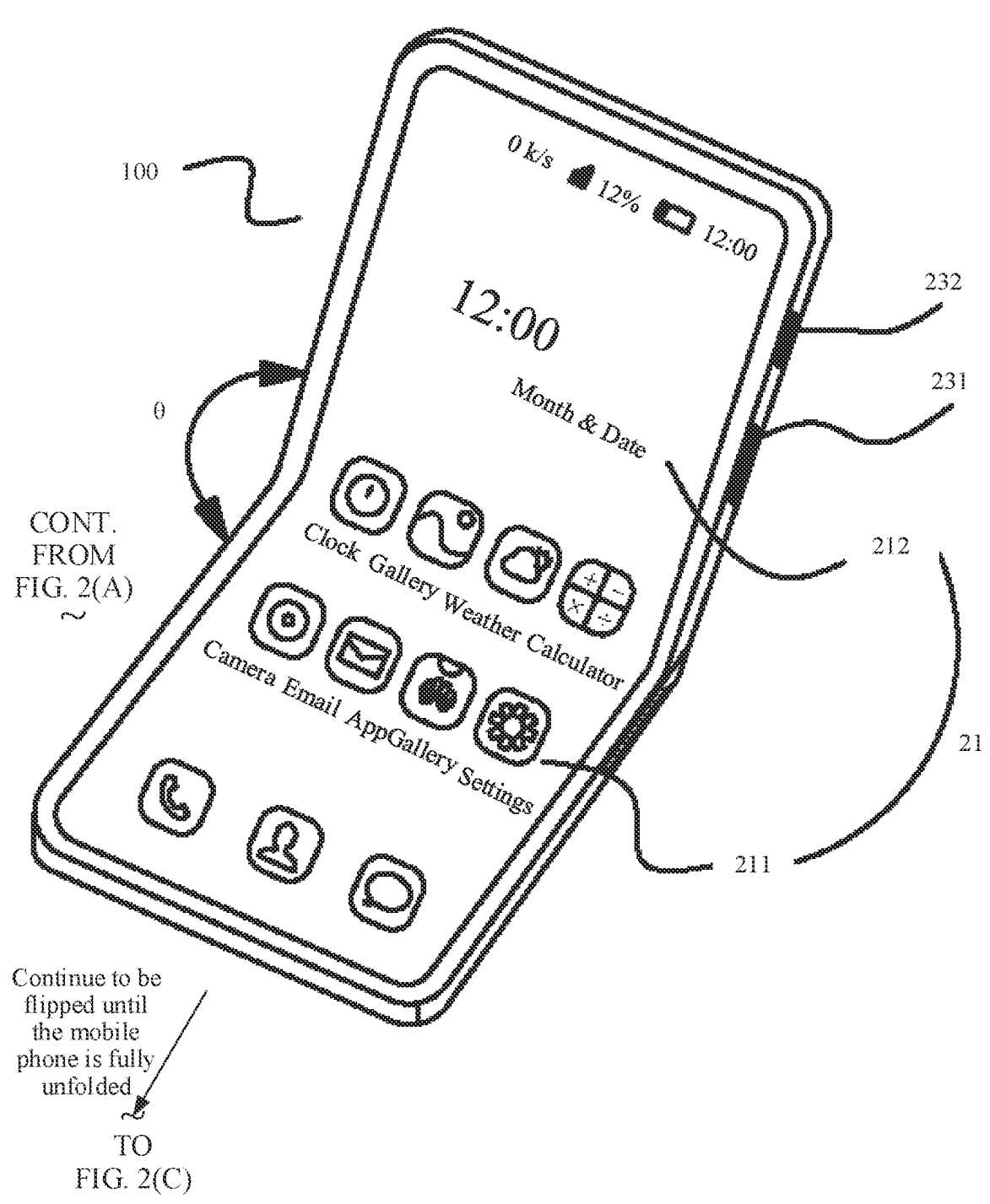
Figure 2C:
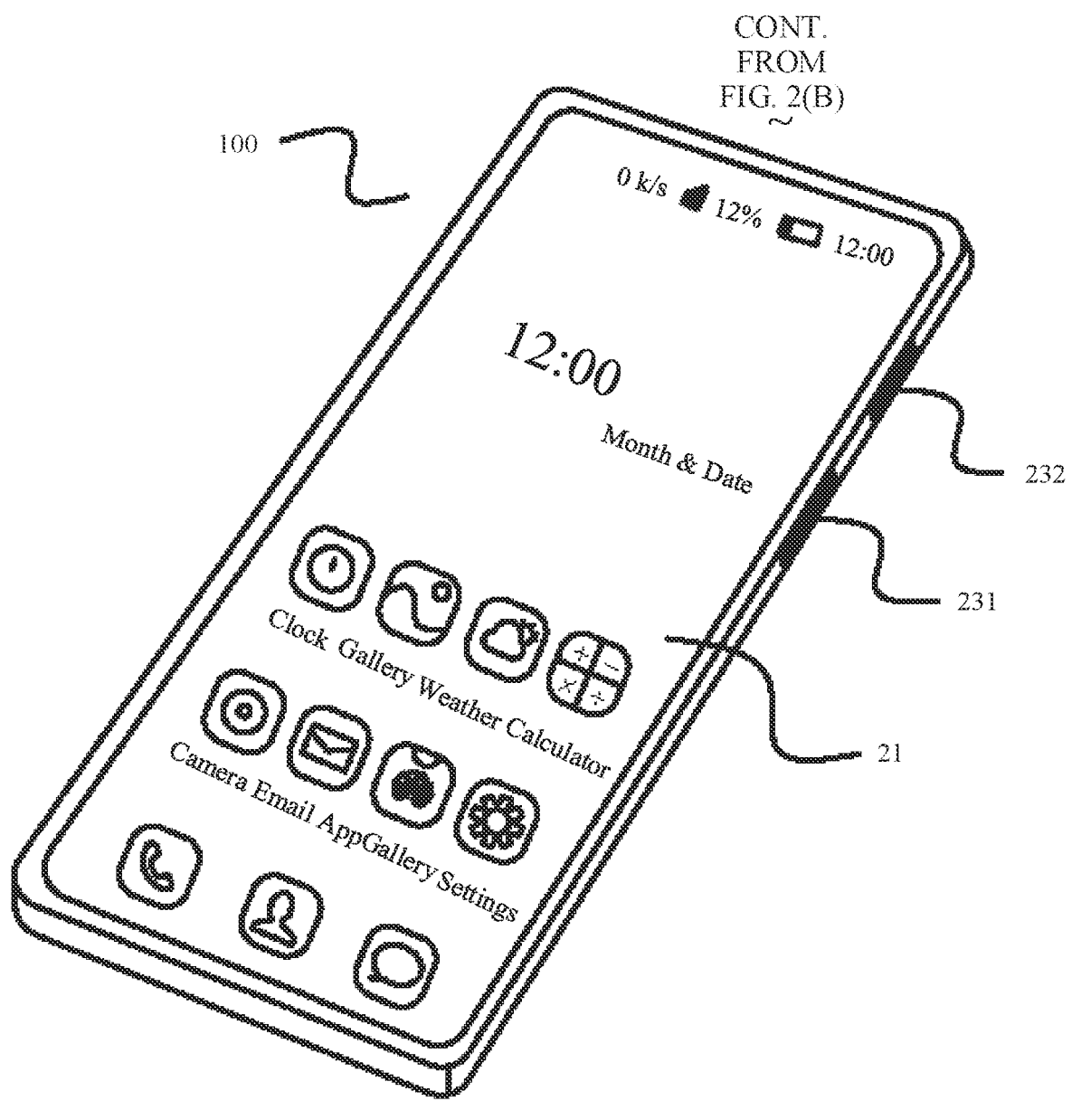

The display screen 194 is configured to display an image, a video, or the like. The display screen 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diode, QLED), or the like. For example, the display screen 194 may be a foldable screen. As shown in FIG. 2(A) to FIG. 2(C), the foldable screen may include an inner screen 21 and an outer screen 22. The inner screen 21 may include a screen 211 and a screen 212. For example, the screen 212 may be referred to as a first screen, the screen 211 may be referred to as a second screen, a body on which the outer screen 22 is located may be referred to as a first body, the screen 212 is located on the first body, and a body on which the screen 211 is located may be referred to as a second body. An included angle between the screen 211 and the screen 212 may be understood as a folding angle θ of the foldable screen. When the foldable screen is in an unexpanded state (that is, the folding angle θ is 0 degrees), namely, is in a state shown in FIG. 2(A), the mobile phone 10 may perform display by using the outer screen 22. When the folding angle θ of the foldable screen is greater than a preset angle (for example, greater than 15 degrees or 20 degrees), the mobile phone 100 may perform display by using the inner screen 21, namely, is in states shown in FIG. 2(B) and FIG. 2(C). In addition, when the folding angle θ of the foldable screen is less than the preset angle, the mobile phone 100 may also perform display by using the outer screen 22. Still refer to FIG. 2(A) to FIG. 2(C). FIG. 2(A) to FIG. 2(C) show a process in which a physical form of the foldable screen is changed from a folded state to an unfolded state. In the state shown in FIG. 2(A), the mobile phone 100 is flipped and unfolded from the folded state. As the folding angle θ of the foldable screen gradually increases, the mobile phone 100 may reach the state shown in FIG. 2(B). The state may be referred to as a semi-unfolded state. In the state shown in FIG. 2(B), the mobile phone 100 continues to be flipped until the folding angle θ reaches a maximum value, namely, reaches 180 degrees. In this case, the mobile phone 100 may reach the state shown in FIG. 2(C). The state may be referred to as a fully unfolded state. For example, still refer to FIG. 2(A) to FIG. 2(C). A button 232 may be disposed on the body on which the outer screen 22 of the mobile phone 100 is located, and a button 231 may be disposed on the body on which the screen 211 of the inner screen 21 of the mobile phone 100 is located. When the foldable screen of the mobile phone 100 is in the unfolded state (namely, in the states of FIG. 2(B) and FIG. 2(C)), both the button 231 and the button 232 are located in an upper area of a side part of the mobile phone 100, where the button 231 is located below the button 232. When the foldable screen of the mobile phone 100 is in the folded state (namely, in the state of FIG. 2(A)), the button 232 is located above the button 231. For example, the button 231 may be referred to as a first button, the button 232 may be referred to as a second button, and a side of the mobile phone 100 on which the button 231 and the button 232 are located may be referred to as a first side.

The external memory interface 120 may be configured to connect to an external storage card, for example, a Micro SD card, to extend a storage capability of the mobile phone 100. The external memory card communicates with the processor 110 through the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system, an application (for example, a sound playing function or an image playing function) required by at least one function, and the like. The data storage area may store data (for example, audio data and an address book) created in a process of using the mobile phone 100, and the like. In addition, the internal memory 121 may include a high-speed random access memory, and may further include a non-volatile memory, for example, at least one magnetic disk storage device, a flash storage device, or a universal flash storage (universal flash storage, UFS). The processor 110 runs the instructions stored in the internal memory 121 and/or the instructions stored in the memory disposed in the processor, to perform various function applications and data processing of the mobile phone 100, for example, perform methods provided in embodiments of this application.

The mobile phone 100 may implement an audio function such as music playing or recording by using the audio module 170, the speaker 170A, the receiver 170B, the microphone 170C, the headset jack 170D, the application processor, and the like.

The gyro sensor 180B may be configured to determine a motion posture of the mobile phone 100. In some embodiments, an angular velocity of the mobile phone 100 around three axes (namely, axes x, y, and z) may be determined by using the gyro sensor 180B. The gyro sensor 180B may be configured to implement image stabilization during photographing. For example, when a shutter is pressed, the gyro sensor 180B detects an angle at which the mobile phone 100 jitters, calculates, based on the angle, a distance for which a lens module needs to compensate, and allows the lens to cancel the jitter of the mobile phone 100 through reverse motion, to implement image stabilization. The gyro sensor 180B may be further used in navigation and somatic game scenarios.

The acceleration sensor 180E may detect a magnitude of an acceleration of the mobile phone 100 in various directions (usually on three axes). When the mobile phone 100 is static, a magnitude and a direction of gravity may be detected. The acceleration sensor 180E may be further configured to identify a posture of the mobile phone, and is applied to an application such as switching between a landscape mode and a portrait mode or a pedometer.

Figure 3:
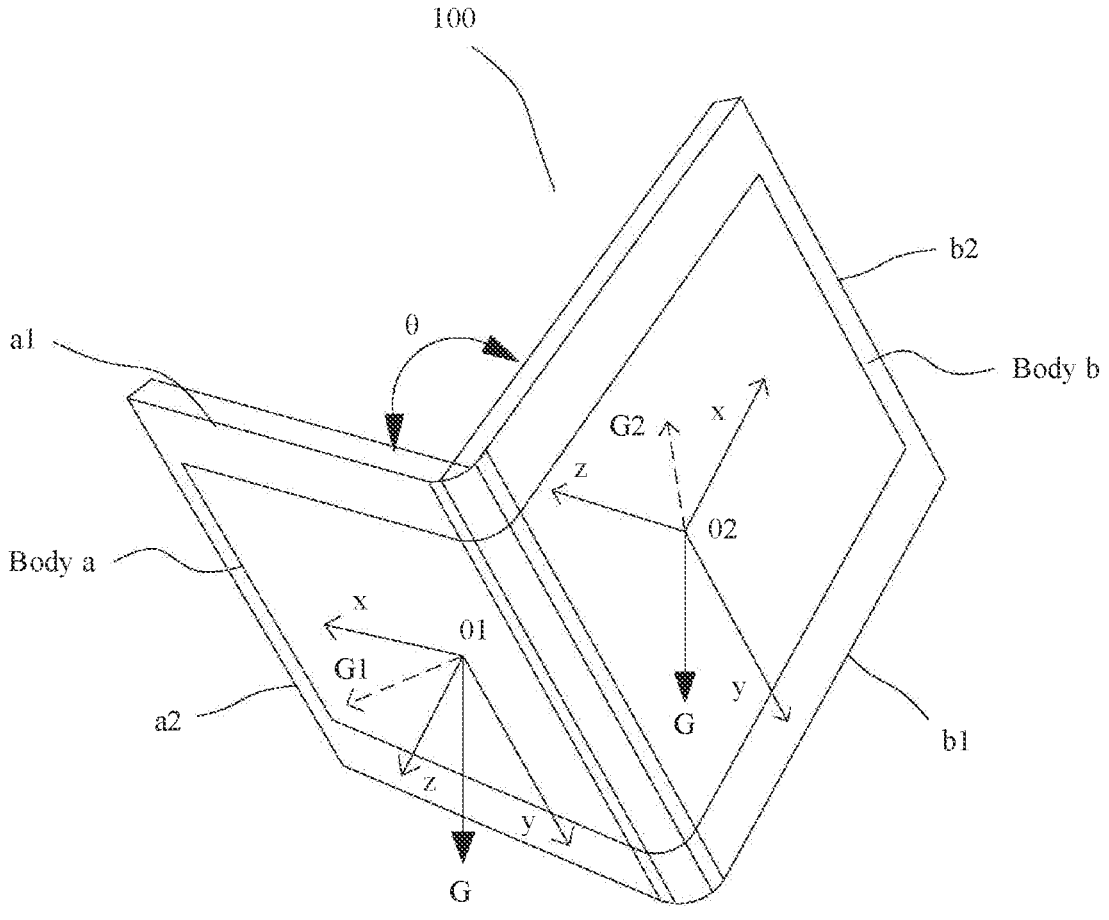
FIG. 3 is a schematic diagram of a structure of a mobile phone according to an embodiment of this application.

In some embodiments, the mobile phone 100 may detect, by using the gyro sensor 180B and the acceleration sensor 180E, the folding angle θ of the foldable screen shown in FIG. 2(B). For example, still refer to FIG. 2(A) to FIG. 2(C). A gyro sensor 180B and an acceleration sensor 180E may be disposed in a body a on which the screen 211 of the inner screen 21 of the mobile phone 100 is located, and a gyro sensor 180B and an acceleration sensor 180E may be disposed in a body b on which the screen 212 of the inner screen 21 of the mobile phone 100 is located. The gyro sensor in the body a on which the screen 211 is located may detect a rotation angular velocity when the body a is rotated, and the acceleration sensor in the body a on which the screen 211 is located may detect an acceleration generated when the body a moves. In this way, the mobile phone 100 may determine a magnitude and a direction of gravity G based on data detected by the gyro sensor and the acceleration sensor in the body a on which the screen 211 is located. Similarly, the mobile phone 100 may also determine a magnitude and a direction of gravity G based on data detected by the gyro sensor and the acceleration sensor in the body b on which the screen 212 is located. Further, as shown in FIG. 3, corresponding coordinate systems may be respectively set on the body a on which the screen 211 is located and the body b on which the screen 212 is located. For example, a Cartesian coordinate system 01 may be set on the body a. In the Cartesian coordinate system 01, an x-axis is parallel to a side edge a1 of the body a, a y-axis is parallel to a side edge a2 of the body a, and a z-axis is perpendicular to a plane formed by the x-axis and the y-axis and points to the outside of the body a. Similarly, a Cartesian coordinate system 02 may be set on the body b. In the Cartesian coordinate system 02, an x-axis is parallel to a side edge b1 of the body b, a y-axis is parallel to a side edge b2 of the body b, and a z-axis is perpendicular to a plane formed by the x-axis and the y-axis and points to the outside of the body b. After a magnitude and a direction of gravity G of the body a in the Cartesian coordinate system 01 and a magnitude and a direction of gravity G of the body b in the Cartesian coordinate system 02 are detected, because the y-axis in the Cartesian coordinate system 01 and the y-axis in the Cartesian coordinate system 02 point to a same direction, a component G1 of the gravity G on the x-axis and the z-axis in the Cartesian coordinate system 01 and a component G2 of the gravity G on a plane of the x-axis and the z-axis in the Cartesian coordinate system 02 are of a same magnitude, but in different directions. In this case, an included angle between the component G1 and the component G2 is an included angle between the Cartesian coordinate system 01 and the Cartesian coordinate system 02, and is also an included angle (namely, the folding angle θ) between the body a and the body b.

The magnetic sensor 180D includes a Hall sensor. The mobile phone 100 may detect the folding angle θ of the foldable screen of the mobile phone 100 by using the magnetic sensor 180D. In an example, still refer to FIG. 3. At least one magnetic element may be disposed in each of the body a and the body b. The mobile phone 100 may detect, by using the magnetic sensor, a strength of a magnetic field between the magnetic elements in the body a and the body b, to determine the folding angle θ of the foldable screen based on the magnetic field strength. For example, a mapping relationship between a strength of the magnetic field between the magnetic elements in the body a and the body b and a folding angle θ may be pre-determined. In this way, after the strength of the magnetic field between the magnetic elements in the body a and the body b is obtained, the folding angle θ may be obtained based on the pre-determined mapping relationship. In addition, the mobile phone 100 may alternatively directly determine the physical form of the foldable screen of the mobile phone 100 based on the strength, detected by the magnetic sensor, of the magnetic field between the magnetic elements in the body a and the body b. For example, when the strength of the magnetic field between the magnetic elements in the body a and the body b is greater than a preset value, it may be determined that the physical form of the foldable screen is the folded state; or when the strength of the magnetic field between the magnetic elements in the body a and the body b is less than or equal to a preset value, it may be determined that the physical form of the foldable screen is the unfolded state.

The touch sensor 180K is also referred to as a "touch component". The touch sensor 180K may be disposed in display screen 194, and the touch sensor 180K and the display screen 194 form a touchscreen, which is also referred to as a "touch screen". The touch sensor 180K is configured to detect a touch operation on or near the touch sensor. The touch sensor may transfer the detected touch operation to the application processor to determine a type of a touch event. A visual output related to the touch operation may be provided on the display screen 194. In some other embodiments, the touch sensor 180K may alternatively be disposed on a surface of the mobile phone 100, and a location of the touch sensor 180K is different from a location of the display screen 194. For example, the touch sensor 180K is disposed on a back or a side part of the mobile phone 100. The back of the mobile phone 100 is a side away from the display screen currently used by the mobile phone 100.

The button 190 includes a power button, a volume button, or the like. The button 190 may be a mechanical button or a touch button. The mobile phone 100 may receive a button input, and generate a button signal input related to a user setting and function control of the mobile phone 100. For example, still refer to FIG. 2(A) to FIG. 2(C). Both the buttons 231 and 232 may be disposed on the side part of the mobile phone 100. It may be understood that, when the mobile phone 100 includes a plurality of buttons, the plurality of buttons may be disposed on a same side of the mobile phone 100, or may be disposed on different sides of the mobile phone 100. This may be specifically determined depending on an actual situation, and is not limited herein.

The motor 191 may generate a vibration alert. The motor 191 may be configured to provide an incoming call vibration prompt or a touch vibration feedback. For example, touch operations performed on different applications (for example photographing and audio play) may correspond to different vibration feedback effects. The motor 191 may also correspond to different vibration feedback effects for touch operations performed on different areas of the display screen 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the mobile phone 100. The mobile phone 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible to different types of SIM cards. The SIM card interface 195 may also be compatible with an external storage card. The mobile phone 100 interacts with a network by using the SIM card, to implement functions such as calling and data communication. In some embodiments, the mobile phone 100 uses an eSIM, that is, an embedded SIM card. The eSIM card may be embedded in the mobile phone 100, and cannot be separated from the mobile phone 100.

A software system of the mobile phone 100 may use a layered architecture, an event-driven architecture, a micro-kernel architecture, a microservice architecture, or a cloud architecture. In this embodiment of the present invention, an Android system with a layered architecture is used as an example to describe the software structure of the mobile phone 100.

Figure 4:
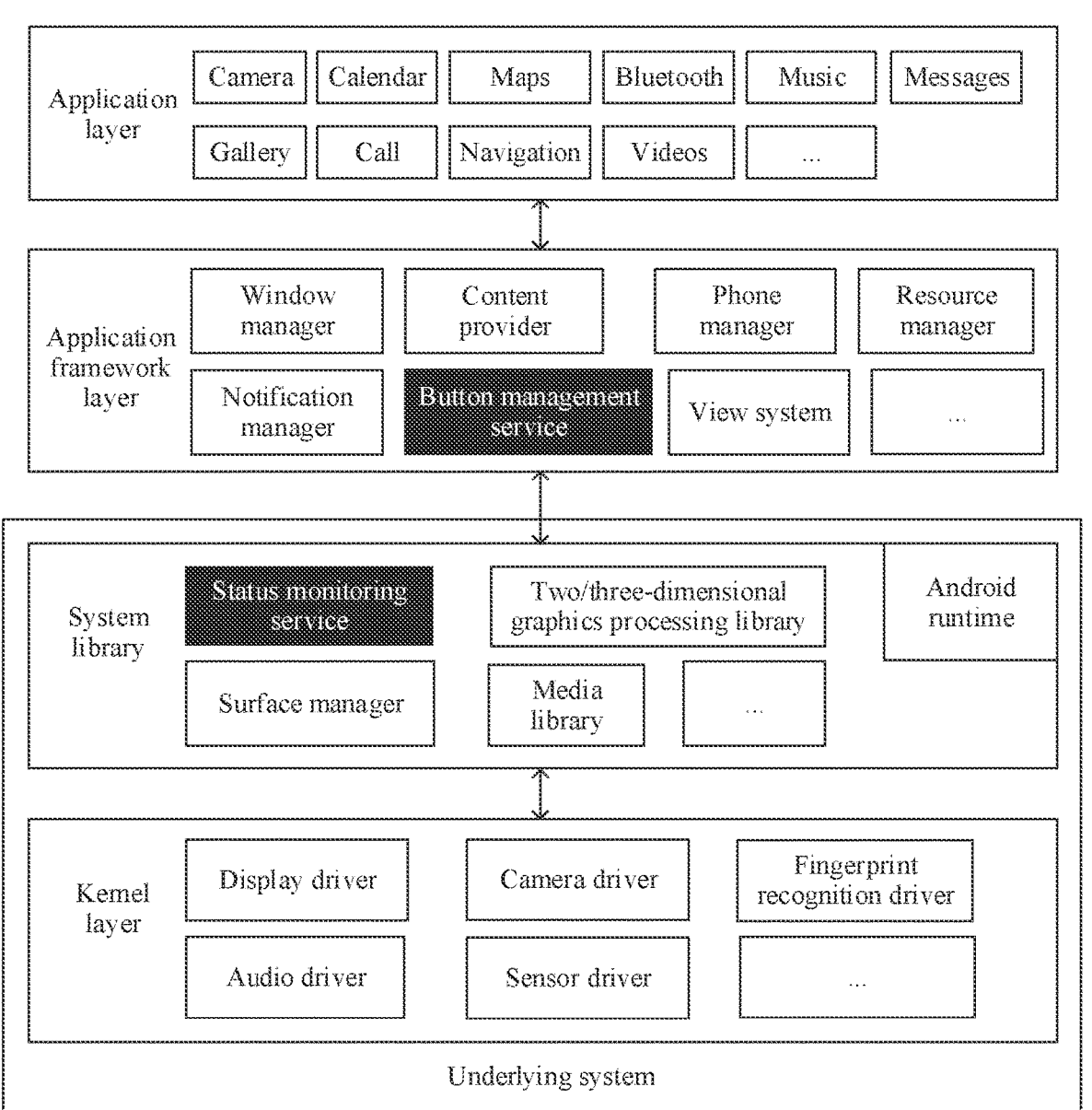
FIG. 4 is a schematic diagram of an architecture of an operating system of a mobile phone according to an embodiment of this application.

FIG. 4 is a block diagram of a software structure of a mobile phone 100 according to an embodiment of the present invention.

In the layered architecture, software is divided into several layers, and each layer has a clear role and responsibility. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 4, the application packages may include applications such as Camera, Gallery, Calendar, Call, Maps, Navigation, WLAN, Bluetooth, Music, Videos, and Messages.

The application framework layer provides an application programming interface (application programming interface, API) and programming framework for applications at the application layer. The application framework layer includes some predefined functions.

As shown in FIG. 4, the application framework layer may include a window manager, a content provider, a phone manager, a resource manager, a notification manager, a button management service, a view system, and the like.

The window manager is configured to manage window programs. The window manager can obtain a size of a display screen, determine whether there is a status bar, lock the screen, capture the screen, and the like.

The content provider is configured to store and retrieve data and make the data accessible to applications. The data may include videos, images, audio, calls made and received, browsing history and bookmarks, a phonebook, and the like.

The phone manager is configured to provide a communication function of the mobile phone 100, for example, management of a call status (including answering, declining, or the like).

The resource manager provides various resources for applications, such as localized strings, icons, pictures, layout files, and video files.

The notification manager enables an application to display notification information in the status bar, and can be used to communicate notification-type messages, which may automatically disappear after a short stay without user interaction. For example, the notification manager is configured to give notifications of download completion, messages, and the like. The notification manager may also be a notification that appears in the top status bar of the system in the form of a chart or scroll bar text, for example, a notification of an application running in the background, or a notification that appears on the screen in the form of a dialog window. For example, text information is prompted in the status bar, an announcement is given, the mobile phone vibrates, or the indicator light blinks.

The button management service may determine, based on a folding status of the foldable screen of the mobile phone 100, a function that needs to be responded to by a button, and when a button event occurs on the mobile phone 100, respond to the button event by using the determined function that needs to be responded to by the button.

The view system may include a visual control, for example, a control for displaying text or a control for displaying a picture. The view system may be configured to build an application. A display interface may be composed of one or more views. For example, a display interface including a short message notification icon may include a view for displaying a text and a view for displaying a picture.

The Android runtime includes a kernel library and a virtual machine. The Android runtime is responsible for scheduling and management of the Android system.

The kernel library includes two parts: a function that needs to be invoked in Java language and a system library of Android.

The application layer and the application framework layer are run on the virtual machine. The virtual machine executes Java files of the application layer and the application framework layer as binary files. The virtual machine is configured to perform functions such as object life cycle management, stack management, thread management, security and exception management, and garbage collection.

The system library may include a plurality of function modules such as a surface manager (surface manager), a media library (Media Library), a three-dimensional graphics processing library (for example, OpenGL ES), a status monitoring service, and a 2D graphics engine (for example, SGL).

The surface manager is configured to manage a display subsystem and provide fusion of 2D and 3D layers for a plurality of applications.

The media library supports playback and recording of various common audio and video formats, static image files, and the like. The media library may support a variety of audio and video coding formats, such as MPEG-4, H.264, MP3, AAC, AMR, JPG, and PNG.

The status monitoring service may invoke a sensor service (sensor service) to start sensors such as the gyro sensor 180B, the acceleration sensor 180E, and the magnetic sensor 180D shown in FIG. 1 to perform detection. The status monitoring service may calculate a current folding angle $\theta$ of the foldable screen of the mobile phone 100 based on detection data reported by each sensor, and determine a folding status of the foldable screen of the mobile phone 100 based on the folding angle $\theta$. In addition, the status monitoring service may also report the determined folding status of the foldable screen of the mobile phone 100 to the button management service.

The three-dimensional graphics processing library is configured to implement three-dimensional graphics drawing, image rendering, composition, and layer processing, and the like.

The 2D graphics engine is a drawing engine for 2D drawing.

The kernel layer is a layer between hardware and software. The kernel layer includes at least a display driver, a camera driver, an audio driver, and a sensor driver.

Similar to FIG. 4, FIG. 5 is a schematic diagram of a data flow direction in a system of a mobile phone 100. As shown in FIG. 5, a gyro sensor and an acceleration sensor, or a magnetic sensor at a hardware layer may report detected data to a sensor (sensor) driver. The sensor driver may report, by using a sensor service (sensor service), the data detected by the gyro sensor and the acceleration sensor, or the data detected by the magnetic sensor to a status monitoring service. The status monitoring service may determine a folding angle of a foldable screen based on the data detected by the gyro sensor and the acceleration sensor, or based on the data detected by the magnetic sensor, to determine a folding status of the foldable screen. The status monitoring service may report the folding status of the foldable screen to a button management service.

In addition, when a button at the hardware layer is triggered (for example, pressed and touched), a button driver at a kernel layer may determine a button event, and report the button event to the status monitoring service. The status monitoring service may report the button event to the button management service. Then, the button management service determines, based on the folding status of the foldable screen, a current function of each button in the button event, and/or outputs a corresponding function.

The foregoing is a related description of a hardware structure and a software architecture of the mobile phone 100. The following continues to use the mobile phone 100 as the electronic device in embodiments of the present invention as an example to describe in detail, with reference to the accompanying drawings, a control method for an electronic device having a foldable screen provided in embodiments of the present invention.

For example, FIG. 6 is a schematic flowchart of a button control method for a mobile phone 100. As shown in FIG. 6, the method may include the following steps.

S601: Obtain a folding angle of a foldable screen of the mobile phone 100.

Specifically, the folding angle of the foldable screen of the mobile phone may be obtained by using a sensor in the mobile phone 100. For example, the folding angle of the foldable screen may be obtained by using the gyro sensor 180B and the acceleration sensor 180E in FIG. 1, or the folding angle of the foldable screen may be obtained by using the magnetic sensor 180D in FIG. 1. For details, refer to the foregoing description. Details are not described herein again.

S602: Determine a physical form of the foldable screen based on the folding angle, where the physical form includes a folded state and an unfolded state.

Specifically, after the folding angle of the foldable screen of the mobile phone 100 is obtained, the physical form of the foldable screen may be determined based on the folding angle, where the physical form includes the folded state or the unfolded state. For example, the folded state may be a form of the mobile phone 100 when the folding angle is less than or equal to a preset angle, for example, a form shown in FIG. 2(A). The unfolded state may be a form of the mobile phone 100 when the folding angle is greater than the preset angle, for example, forms shown in FIG. 2(B) and FIG. 2(C). For example, when the folding angle is in (0 degrees, 20 degrees], the physical form may be the folded state, and when the folding angle is in (20 degrees, 180 degrees), the physical form may be the unfolded state.

S603: When a button event is obtained, determine, based on the physical form, a target function that needs to be responded to by each button in a button group on the mobile phone 100, where the button group includes at least one button, and target functions that need to be responded to by each button in the button group and that correspond to different physical forms are different.

Specifically, when a button on the mobile phone 100 is triggered (for example, triggered by being pressed), it may be determined that the button event is obtained. After the button event is obtained, the target function that needs to be responded to by each button in the button group on the mobile phone 100 may be determined based on the physical form. The button group includes at least one button, and target functions that need to be responded to by each button in the button group and that correspond to different physical forms are different.

For example, a mapping relationship between a function that needs to be responded to by each button in the button group on the mobile phone 100 and a physical form of the foldable screen may be preset. In this way, after the button event is obtained, the mapping relationship may be queried based on the physical form of the foldable screen, and the target function that needs to be responded to by each button in the button group on the mobile phone 100 in the current physical form of the foldable screen may be determined.

For example, a mapping relationship between a function that needs to be responded to by each button in the button group on the mobile phone 100 and a physical form of the foldable screen may be preset, as shown in Table 1. In Table 1, buttons in the button group include a button a and a button b. When the physical form of the foldable screen is the unfolded state, a function that needs to be responded to by the button a is power-on/off, and a function that needs to be responded to by the button b is volume adjustment. When the physical form of the foldable screen is the folded state, a function that needs to be responded to by the button a is volume adjustment, and a function that needs to be responded to by the button b is power-on/off. Therefore, when the button event is obtained, if the current physical form of the foldable screen is the folded state, the function that needs to be responded to by the button a in the button group on the mobile phone 100 is volume adjustment, and the function that needs to be responded to by the button b is power-on/off. In an example, functions corresponding to power-on/off may include power-on, power-off, screen locking, screen-on, and the like. This is not limited herein.

TABLE 1

| | Physical form | |
| | --- | --- |
| | Unfolded state | Folded state |
| Button | Button function | |
| Button a | Power-on/off | Volume increase |
| Button b | Volume adjustment | Power-on/off |

In addition, a mapping relationship between a function that needs to be responded to by each button in the button group on the mobile phone 100 and a physical form of the foldable screen may alternatively be preset, as shown in Table 2. In Table 2, buttons in the button group include a button a, a button b, and a button c. When the physical form of the foldable screen is the unfolded state, a function that needs to be responded to by the button a is power-on/off, a function that needs to be responded to by the button b is volume increase, and a function that needs to be responded to by the button c is volume decrease. When the physical form of the foldable screen is the folded state, a function that needs to be responded to by the button a is volume increase, a function that needs to be responded to by the button b is power-on/off, and a function that needs to be responded to by the button c is volume decrease. Therefore, when the button event is obtained, if the current physical form of the foldable screen is the folded state, the function that needs to be responded to by the button a in the button group on the mobile phone 100 is volume increase, the function that needs to be responded to by the button b is power-on/off, and the function that needs to be responded to by the button c is volume decrease.

TABLE 2

| | Physical form | |
| | --- | --- |
| | Unfolded state | Folded state |
| Button | Button function | |
| Button a | Power-on/off | Volume increase |
| Button b | Volume increase | Power-on/off |
| Button c | Volume decrease | Volume decrease |

S604: Respond to the button event by using the determined target function.

Specifically, when the target function that needs to be responded to by each button in the button group on the mobile phone 100 is determined, the target function may be used to respond to the button event. For example, still refer to Table 1. If the currently determined target function that needs to be responded to by each button in the button group on the mobile phone 100 is: the function that needs to be responded to by the button a is volume adjustment, and the function that needs to be responded to by the button b is power-on/off, in the button event, a function corresponding to volume adjustment is performed if a user triggers the button a; or a function corresponding to power-on/off is performed if a user triggers the button b.

It may be understood that S603 may alternatively be replaced with "determine, based on the physical form, a target function that needs to be responded to by each button in a button group on the mobile phone 100, where the button group includes at least one button, and target functions that need to be responded to by each button in the button group and that correspond to different physical forms are different". In addition, S604 may be replaced with "when a button event is obtained, respond to the button event by using the determined target function". To be specific, after the physical form of the foldable screen is determined, a function of each button may be first determined based on the physical form. Then, when a button is triggered, a determined function of the button may be used to respond to the button event, that is, the function of the button is output. For example, if the currently determined physical form of the foldable screen is the folded state, and the determined function of the button a in the folded state is volume decrease, volume decrease may be output when the button a is triggered, that is, a volume of output audio of the mobile phone 100 is reduced.

For example, the button a may be referred to as a first button. When the physical form of the foldable screen is the folded state, the function that needs to be responded to by the button a (namely, the first button) may be referred to as a first function. When the physical form of the foldable screen is the unfolded state, the function that needs to be responded to by the button a (namely, the first button) may be referred to as a second function. When the physical form of the foldable screen is the folded state, the first function is output if the button a (namely, the first button) is triggered; or when the physical form of the foldable screen is the unfolded state, the second function is output if the button a (namely, the first button) is triggered.

In addition, the button b may be referred to as a second button. When the physical form of the foldable screen is the folded state, the function that needs to be responded to by the button b (namely, the second button) may be referred to as a third function. When the physical form of the foldable screen is the unfolded state, the function that needs to be responded to by the button b (namely, the second button) may be referred to as a fourth function. When the physical form of the foldable screen is the folded state, the third function is output if the button b (namely, the second button) is triggered; or when the physical form of the foldable screen is the unfolded state, the fourth function is output if the button b (namely, the second button) is triggered. For example, the first function may be the same as the fourth function, and the second function may be the same as the third function.

Therefore, in a process in which the user uses the mobile phone 100, the function that needs to be responded to by each button in the button group on the mobile phone 100 is adaptively adjusted based on the physical form of the foldable screen of the mobile phone 100. In this way, a button function that meets a using habit of the user can still be provided when the foldable screen of the mobile phone 100 is in a different physical form. This avoids a problem that a function of a button on the mobile phone 100 is not consistent with a normal use function when the foldable screen of the mobile phone 100 is in a different physical form, and improves user experience.

The foregoing is a related description of the button control method for the electronic device provided in this embodiment of this application. For ease of understanding, the following continues to use the mobile phone 100 described above as an example to describe the button control method for the electronic device provided in this embodiment of this application.

Figure 7:
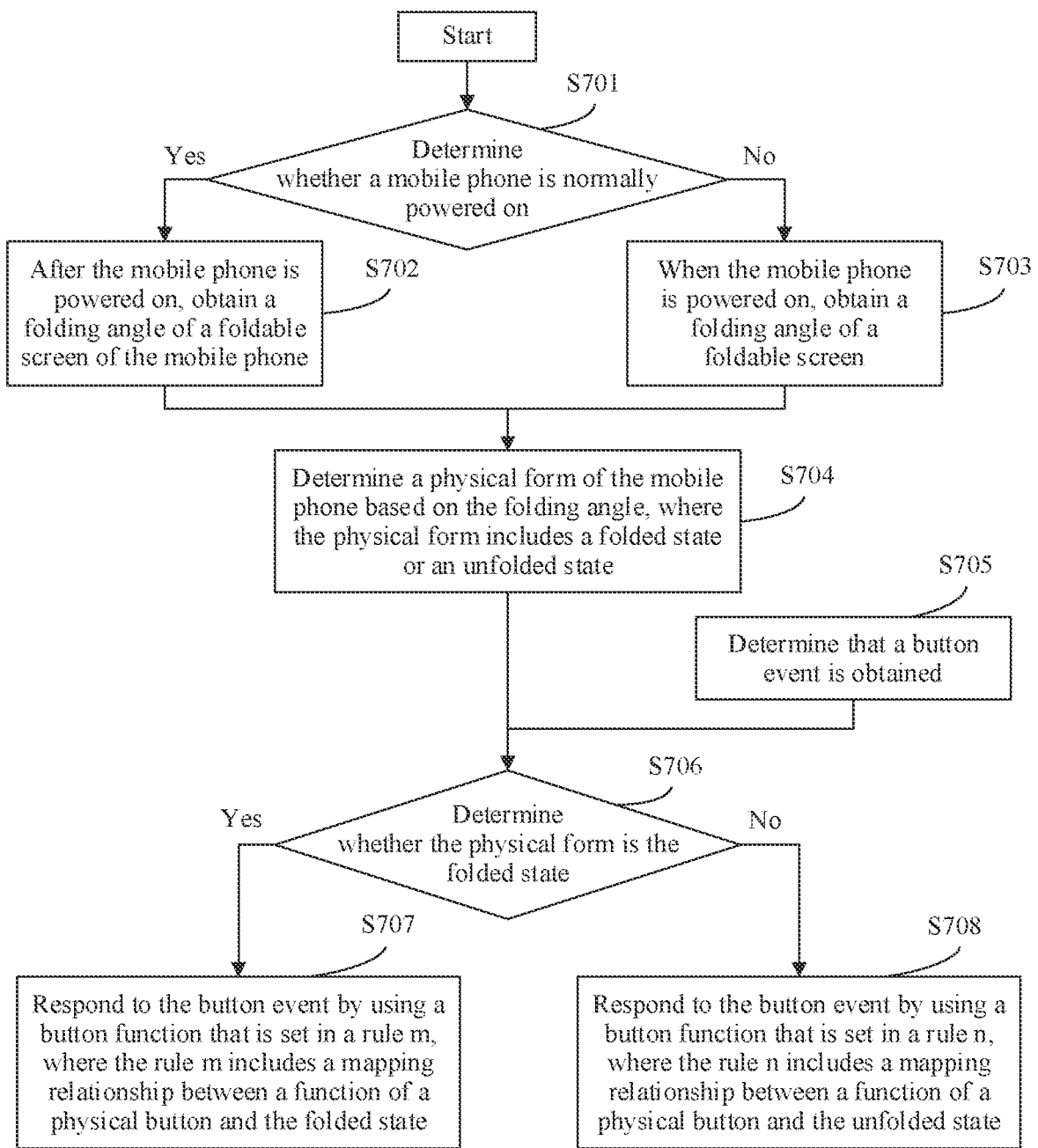
FIG. 7 is a schematic diagram of steps of a button control method for a mobile phone according to an embodiment of this application.

For example, FIG. 7 is a schematic flowchart of a button control method for a mobile phone 100. In FIG. 7, the mobile phone 100 is provided with two buttons, and the two buttons may be the button 231 and the button 232 shown in FIG. 2(A) to FIG. 2(C). For example, still refer to FIG. 2(A) to FIG. 2(C). In FIG. 2(B) and FIG. 2(C), both the button 231 and the button 232 are located in an upper area of a side part of the mobile phone 100, and the button 231 is located below the button 232. In this case, the button 231 may be referred to as a lower button, and the button 232 may be referred to as an upper button. In FIG. 2(A), the button 231 is located above the button 232. In this case, the button 231 may be referred to as an upper button, and the button 232 may be referred to as a lower button. Still refer to FIG. 7. As shown in FIG. 7, the method may include the following steps.

S701: Determine whether the mobile phone 100 is normally powered on.

Specifically, when the mobile phone 100 is powered on, it may be determined whether the mobile phone 100 is normally powered on. When the mobile phone 100 is normally powered on, S702 is performed. When the mobile phone 100 is abnormally powered on, S703 is performed.

For example, generally, running modes of the mobile phone 100 may include a normal mode and an abnormal mode. The normal mode may be understood as a mode in which the mobile phone 100 is normally started, for example, by pressing and holding a power button on the mobile phone 100. The abnormal mode may be understood as a mode other than the normal mode, for example, a ROM flashing (recovery) mode or a quick start (fastboot) mode. Because different buttons usually need to be selected to control the mobile phone 100 to enter different running modes, whether the mobile phone 100 is normally powered on may be determined based on a quantity and/or functions of buttons operated by a user when the user controls the mobile phone 100 to be powered on. For example, when the user presses only one button to power on the mobile phone 100, it may be determined that the mobile phone 100 is normally powered on; or when the user simultaneously presses a plurality of buttons to power on the mobile phone 100, it may be determined that the mobile phone 100 is abnormally powered on.

It may be understood that S701 does not need to be performed each time. When the mobile phone 100 is in a power-off state before S701 is performed, this step may be performed each time. After the mobile phone 100 is powered on normally, it may be selected that this step is not performed, but S702 is directly performed.

S702: After the mobile phone 100 is powered on, obtain a folding angle of a foldable screen of the mobile phone 100.

Specifically, after it is determined that the mobile phone 100 is normally powered on, the folding angle of the foldable screen of the mobile phone 100 may be obtained after the mobile phone 100 is powered on, that is, in a process in which the user normally uses the mobile phone 100.

For example, still refer to FIG. 1. The folding angle of the foldable screen may be obtained by using the gyro sensor 180B and the acceleration sensor 180E in the mobile phone 100, or the folding angle of the foldable screen may be obtained by using the magnetic sensor 180D (for example, a Hall sensor) in the mobile phone 100. For details, refer to the foregoing description. Details are not described herein again. In an example, because detection precision of the magnetic sensor is relatively low, in this step, the gyro sensor and the acceleration sensor may be selected to obtain the folding angle of the foldable screen.

S703: When the mobile phone 100 is powered on, obtain a folding angle of a foldable screen.

Specifically, after it is determined that the mobile phone 100 is powered on abnormally, the folding angle of the foldable screen of the mobile phone 100 may be obtained when the mobile phone 100 is powered on.

For example, because the gyro sensor and the acceleration sensor in the mobile phone 100 are not started to run in this case, the folding angle of the foldable screen may be obtained by using the magnetic sensor (for example, the Hall sensor) in the mobile phone 100.

It may be understood that a difference between S702 and S703 lies in that, in S702, the folding angle of the foldable screen is obtained after the mobile phone 100 is powered on, and in S703, the folding angle of the foldable screen is obtained when the mobile phone 100 is powered on.

S704: Determine a physical form of the foldable screen based on the folding angle, where the physical form includes a folded state and an unfolded state.

Specifically, after the folding angle is determined, the physical form of the foldable screen may be determined based on the folding angle. The physical form includes the folded state or the unfolded state. For details, refer to the description in S602 in FIG. 6. Details are not described herein again.

S705: Determine that a button event is obtained.

Specifically, when a button a or a button b on the mobile phone 100 is triggered (for example, triggered by being pressed), it may be determined that the button event is obtained.

S706: Determine whether the physical form of the foldable screen is the folded state.

Specifically, after the physical form of the foldable screen is determined in S704, whether the physical form of the foldable screen is the folded state may be determined in this step. When the physical form of the foldable screen is the folded state, S707 is performed. When the physical form of the foldable screen is not the folded state (namely, is the unfolded state), S708 is performed.

S707: Respond to the button event by using a button function that is set in a rule m, where the rule m includes a mapping relationship between the button function and the folded state.

Specifically, when the physical form of the foldable screen is the folded state, the button event may be responded to by using the button function that is set in the rule m, where the rule m includes the mapping relationship between the button function and the folded state.

For example, still refer to FIG. 2(A). The rule m may be that when the physical form of the foldable screen is the folded state, a button function responded to by the button 231 (namely, the upper button) is a volume adjustment button, and a button function responded to by the button 232 (that is, the lower button) is a power button (namely, a power button).

S708: Respond to the button event by using a button function that is set in a rule n, where the rule n includes a mapping relationship between the button function and the unfolded state.

Specifically, when the physical form of the foldable screen is the unfolded state, the button event may be responded to by using the button function that is set in the rule n, where the rule n includes the mapping relationship between the button function and the unfolded state.

For example, still refer to FIG. 2(B) and FIG. 2(C). The rule n may be that when the physical form of the foldable screen is the unfolded state, a button function responded to by the button 231 (namely, the lower button) is a power button (namely, a power button), and a button function responded to by the button 232 (namely, the upper button) is a volume adjustment button.

Therefore, when the foldable screen of the mobile phone 100 is in the folded state, the user may adjust a volume by operating the upper button (namely, the button 231) on the mobile phone 100, or perform power-on/off by operating the lower button (namely, the button 232) on the mobile phone 100. When the foldable screen of the mobile phone 100 is in the unfolded state, the user may adjust a volume by operating the upper button (namely, the button 232) on the mobile phone 100, or perform power-on/off by operating the lower button (namely, the button 231) on the mobile phone 100.

The foregoing is the button control method for the electronic device provided in embodiments of this application. The following describes another button control method for an electronic device according to an embodiment of this application. The method is mainly to adaptively adjust, based on a holding posture with which a user currently holds the electronic device, a function that needs to be responded to by each button in a button group on the electronic device, so that a button function that conforms to a using habit of the user can still be provided when the holding posture with which the user holds the electronic device occurs. This avoids a problem that a function of a button on the electronic device is not consistent with a normal use function when the holding posture with which the user holds the electronic device occurs, and improves user experience. For example, a currently common electronic device is a mobile phone, and a screen of the mobile phone is relatively large. When the user holds the mobile phone by using a left hand, and a button is on a right side of the mobile phone, the user needs to operate the button by using a right hand. In some scenarios (for example, when a hand holds a handle on a bus or a subway), the operation is inconvenient. Therefore, whether the user holds the mobile phone by using the left hand or the right hand needs to be automatically identified based on a holding posture of the user, to adaptively adjust a function that needs to be responded to by the button on the mobile phone. This facilitates user operations and improves user experience.

For example, the mobile phone 100 described above is still used as an example. In this case, the display screen of the mobile phone 100 may be a foldable screen, or may be a non-foldable screen. This is not limited herein. FIG. 8 is a schematic flowchart of a button control method for a mobile phone 100. Buttons of the mobile phone 100 described in FIG. 8 may include at least two buttons that are respectively disposed on different sides of the screen of the mobile phone 100. For example, as shown in FIG. 9, a button 233 is disposed on a left side of the screen of the mobile phone 100, and a button 234 is disposed on a right side of the screen of the mobile phone 100.

As shown in FIG. 8, the method includes the following steps.

S801: Determine a holding posture with which a user currently holds the mobile phone 100 where the holding posture includes left-hand holding or right-hand holding.

Specifically, a touch component (for example, the touch sensor 180K shown in FIG. 1) may be disposed in the mobile phone 100. The touch component may report a current touch location of the user periodically or in real time. Further, the holding posture with which the user currently holds the mobile phone is determined based on the touch location by using a preset holding algorithm, where the holding posture includes left-hand holding or right-hand holding.

For example, a touch capacitance value generated by the touch component may be obtained, to determine a location (that is, each touch location) of each point on which the user is currently in contact with the mobile phone 100. In this way, a shape of a contact surface between a palm of the user and the mobile phone 100 is determined based on the location of each point. Then, the shape of the contact surface is compared with a preset left-hand holding shape and a preset right-hand holding shape, and a similarity between the shape of the contact surface and the preset left-hand holding shape is determined, and a similarity between the shape of the contact surface and the preset right-hand holding shape is determined. Finally, a holding shape corresponding to a value with the highest similarity is selected as the current holding posture. For example, when the similarity between the shape of the contact surface and the preset left-hand holding shape is the highest, the current holding posture is left-hand holding; or when the similarity between the shape of the contact surface and the preset right-hand holding shape is the highest, the current holding posture is right-hand holding.

S802: When a button event is obtained, determine, based on the holding posture, a target function that needs to be responded to by each button in a button group on the mobile phone 100, where the button group includes at least one button, and target functions that need to be responded to by each button in the button group and that correspond to different holding postures are different.

Specifically, when a button on the mobile phone 100 is triggered (for example, triggered by being pressed), it may be determined that the button event is obtained. After the button event is obtained, the target function that needs to be responded to by each button in the button group on the mobile phone 100 may be determined based on the holding posture. The button group includes at least one button, and target functions that need to be responded to by each button in the button group and that correspond to different holding postures are different.

For example, a mapping relationship between a function that needs to be responded to by each button in the button group on the mobile phone 100 and a holding posture may be preset. In this way, after the button event is obtained, the mapping relationship may be queried based on the holding posture, and the target function that needs to be responded to by each button in the button group on the mobile phone 100 in the current holding posture may be determined.

For example, a mapping relationship between a function that needs to be responded to by each button in the button group on the mobile phone 100 and a holding posture may be preset, as shown in Table 3. In Table 3, buttons in the button group include a button a and a button b. When the holding posture is left-hand holding, a function that needs to be responded to by the button a is power-on/off, and a function that needs to be responded to by the button b is volume adjustment. When the holding posture is right-hand holding, a function that needs to be responded to by the button a is volume adjustment, and a function that needs to be responded to by the button b is power-on/off. Therefore, when the button event is obtained, if the current holding posture is right-hand holding, the function that needs to be responded to by the button a in the button group on the mobile phone 100 is volume adjustment, and the function that needs to be responded to by the button b is power-on/off. In an example, functions corresponding to power-on/off may include power-on, power-off, screen locking, screen-on, and the like. This is not limited herein.

TABLE 3

| | Holding posture | |
| | Left-hand holding | Right-hand holding |
| Button | Button function | |
| --- | --- | --- |
| Button a | Power-on/off | Volume adjustment |
| Button b | Volume adjustment | Power-on/off |

In addition, a mapping relationship between a function that needs to be responded to by each button in the button group on the mobile phone 100 and a holding posture may alternatively be preset, as shown in Table 4. In Table 4, buttons in the button group include a button a, a button b, and a button c. When the holding posture is left-hand holding, a function that needs to be responded to by the button a is power-on/off, a function that needs to be responded to by the button b is volume increase, and a function that needs to be responded to by the button c is volume decrease. When the holding posture is right-hand holding, a function that needs to be responded to by the button a is volume increase, a function that needs to be responded to by the button b is power-on/off, and a function that needs to be responded to by the button c is volume decrease. Therefore, when the button event is obtained, if the holding posture is right-hand holding, the function that needs to be responded to by the button a in the button group on the mobile phone 100 is volume increase, the function that needs to be responded to by the button b is power-on/off, and the function that needs to be responded to by the button c is volume decrease.

TABLE 4

| | Holding posture | |
| | Left-hand holding | Right-hand holding |
| Button | Button function | |
| --- | --- | --- |
| Button a | Power-on/off | Volume increase |
| Button b | Volume increase | Power-on/off |
| Button c | Volume decrease | Volume decrease |

S803: Respond to the button event by using the determined target function.

Specifically, when the target function that needs to be responded to by each button in the button group on the mobile phone 100 is determined, the target function may be used to respond to the button event. For example, still refer to Table 3. If the currently determined target function that needs to be responded to by each button in the button group on the mobile phone 100 is: the function that needs to be responded to by the button a is volume adjustment, and the function that needs to be responded to by the button b is power-on/off in the button event, a function corresponding to volume adjustment is performed if the user triggers the button a: or a function corresponding to power-on/off is performed if the user triggers the button b.

Figure 10:
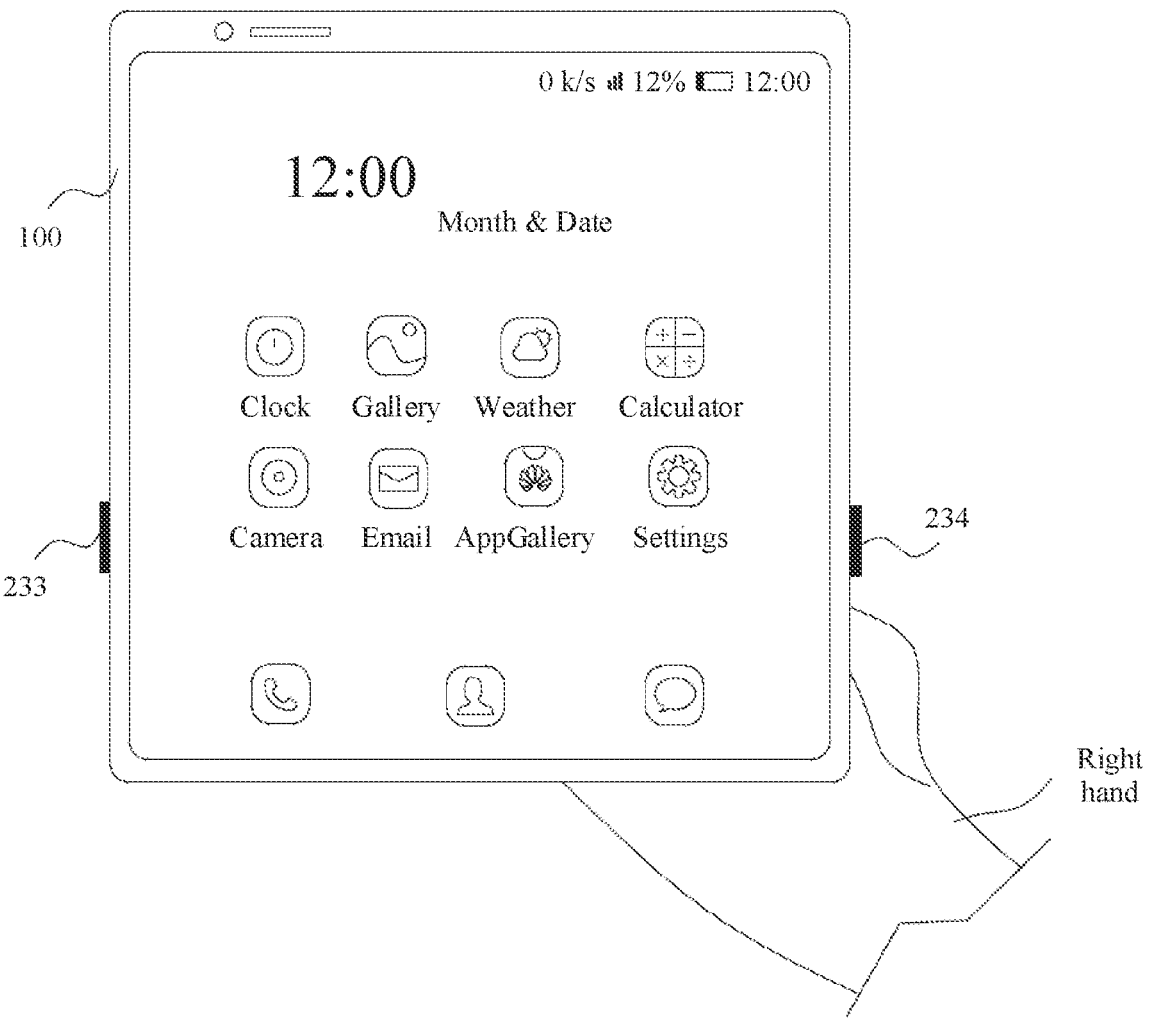
FIG. 10 is a schematic diagram of holding a mobile phone with a right hand according to an embodiment of this application.
Figure 11:
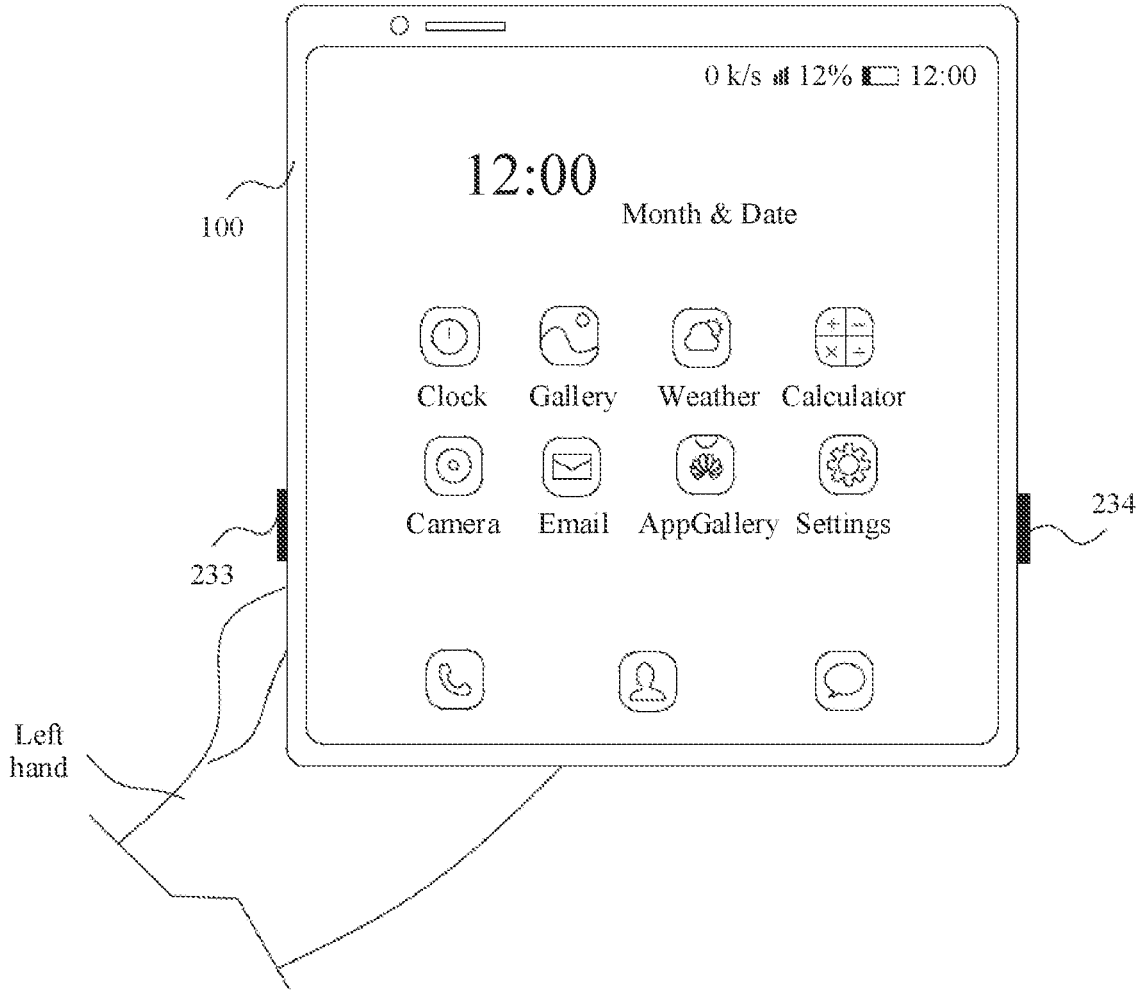
FIG. 11 is a schematic diagram of holding a mobile phone with a left hand according to an embodiment of this application.

For example, it is predefined in the mobile phone 100 that in a state of left-hand holding, a function of the button 233 is volume adjustment, and a function of the button 234 is power-on/off; and in a state of right-hand holding, a function of the button 233 is power-on/off and a function of the button 234 is volume adjustment. As shown in FIG. 10, a holding posture of the user is right-hand holding. In this case, when the user triggers the button 234, the mobile phone 100 may respond to the function of volume adjustment. As shown in FIG. 11, a holding posture of the user is left-hand holding. In this case, when the user triggers the button 233, the mobile phone 100 may respond to the function of volume adjustment.

It may be understood that S802 may alternatively be replaced with "determine, based on the holding posture, a target function that needs to be responded to by each button in a button group on the mobile phone 100, where the button group includes at least one button, and target functions that need to be responded to by each button in the button group and that correspond to different holding postures are different". In addition, S803 may be replaced with "when a button event is obtained, respond to the button event by using the determined target function". To be specific, after the holding posture is determined, a function of each button may be first determined based on the holding posture. Then, when a button is triggered, a determined function of the button may be used to respond to the button event, that is, the function of the button is output. For example, if the currently determined holding posture is right-hand holding, and it is determined that a function of the button a in a state of right-hand holding is volume decrease, volume decrease may be output when the button a is triggered, that is, a volume of output audio of the mobile phone 100 is reduced. For example, the button a may be referred to as a fourth button. When the holding posture is left-hand holding, the function that needs to be responded to by the button a may be referred to as a sixth function. When the holding posture is right-hand holding, the function that needs to be responded to by the button a may be referred to as a seventh function. When the holding posture is left-hand holding, the sixth function is output if the fourth button is triggered. When the holding posture is right-hand holding, the seventh function is output if the fourth button is triggered. For example, the fourth button may be the same as the first button described above. In addition, the sixth function may be the same as the first function or the second function described above, and the seventh function may be the same as the first function or the second function described above, where the sixth function is different from the seventh function.

Therefore, in a process in which the user uses the mobile phone 100, the function that needs to be responded to by each button in the button group on the mobile phone 100 is adaptively adjusted based on the holding posture with which the user currently holds the mobile phone, so that a button function that conforms to a using habit of the user can still be provided when the holding posture with which the user holds the mobile phone 100 occurs. This avoids a problem that a function of a button on the mobile phone 100 is not consistent with a normal use function when the holding posture with which the user holds the mobile phone 100 occurs, and improves user experience.

In an example, in addition to the foregoing described button control methods for the electronic device, an embodiment of this application further provides another button control method for an electronic device. According to the method, when the electronic device is rotated, a function that needs to be responded to by each button in a button group on the electronic device may be adaptively adjusted based on a rotation angle of the electronic device, so that a button function that conforms to a using habit of a user can still be provided when the electronic device is rotated, thereby improving user experience.

For example, the mobile phone 100 described above is still used as an example. In this case, the display screen of the mobile phone 10 may be a foldable screen, or may be a non-foldable screen. This is not limited herein. When the display screen of the mobile phone 100 is a foldable screen, a physical form of the foldable screen may be a folded state, or may be an unfolded state. This is not limited herein. FIG. 12 is a schematic flowchart of a button control method for the mobile phone 100. As shown in FIG. 12, the method may include the following steps.

S1201: When it is detected that the mobile phone 100 is rotated around a z-axis, obtain a rotation angle of the mobile phone 10 relative to a reference state of the mobile phone 100 on a plane on which an x-axis and a y-axis are located. The z-axis is an axis perpendicular to the display screen of the mobile phone 100, the x-axis is an axis parallel to a side part of the mobile phone 10, the y-axis is an axis perpendicular to a plane on which the x-axis and the z-axis are located, and the reference state is a state of the mobile phone 100 in which a lower side edge of the mobile phone 100 is parallel to a horizontal plane and a distance between an upper side edge of the mobile phone 100 and the horizontal plane is greater than or equal to a distance between the lower side edge of the mobile phone 100 and the horizontal plane.

Specifically, a spatial coordinate system may be constructed in advance. In the spatial coordinate system, an x-axis is an axis parallel to the side part of the mobile phone 100, a z-axis is an axis perpendicular to the display screen of the mobile phone 10, and a y-axis is an axis perpendicular to a plane on which the x-axis and the z-axis are located. When the mobile phone 100 is rotated around the z-axis, a gyro sensor (for example, the gyro sensor 180B shown in FIG. 1) in the mobile phone 100 may be used to obtain the rotation angle of the mobile phone 100 relative to the reference state of the mobile phone 100 on the plane on which the x-axis and the y-axis are located. The reference state is a state of the mobile phone 100 when the lower side edge of the mobile phone 100 is parallel to the horizontal plane.

S1202. When a button event is obtained, determine, based on the rotation angle, a target function that needs to be responded to by each button in a button group on the mobile phone 100, where the button group includes at least one button, and target functions that need to be responded to by each button in the button group and that correspond to different rotation angles are different.

Specifically, when a button on the mobile phone 100 is triggered (for example, triggered by being pressed), it may be determined that the button event is obtained. After the button event is obtained, the target function that needs to be responded to by each button in the button group on the mobile phone 100 may be determined based on the rotation angle. The button group includes at least one button, and target functions that need to be responded to by each button in the button group and that correspond to different rotation angles are different.

For example, a mapping relationship between a function that needs to be responded to by each button in the button group on the mobile phone 100 and a rotation angle of the mobile phone 100 may be preset. In this way, after the button event is obtained, the mapping relationship may be queried based on the obtained rotation angle, and the target function that needs to be responded to by each button in the button group on the mobile phone 100 at the rotation angle may be determined.

For example, a mapping relationship between a function that needs to be responded to by each button in the button group on the mobile phone 100 and a rotation angle may be preset, as shown in Table 5. In Table 5, buttons in the button group include a button a and a button b. When the rotation angle is 0°, a function that needs to be responded to by the button a is power-on/off, and a function that needs to be responded to by the button b is volume adjustment. When the rotation angle is 900, a function that needs to be responded to by the button a is volume adjustment, and a function that needs to be responded to by the button b is power-on/off. When the rotation angle is 180°, a function that needs to be responded to by the button a is power-on/off, and a function that needs to be responded to by the button b is volume adjustment. When the rotation angle is 270°, a function that needs to be responded to by the button a is volume adjustment, and a function that needs to be responded to by the button b is power-on/off. When the rotation angle is 360°, a function that needs to be responded to by the button a is power-on/off, and a function that needs to be responded to by the button b is volume adjustment. Therefore, when the button event is obtained, if the rotation angle of the mobile phone 100 is 90°, the function that needs to be responded to by the button a in the button group on the mobile phone 100 is volume adjustment, and the function that needs to be responded to by the button b is power-on/off. In an example, functions corresponding to power-on/off may include power-on, power-off, screen locking, screen-on, and the like. This is not limited herein.

TABLE 5

| Button | Rotation angle | | | | |
| | 0° | 90° | 180° | 270° | 360° |
| | Button function | | | | |
|---|---|---|---|---|---|
| Button a | Power-on/ off | Volume adjustment | Power-on/ off | Volume adjustment | Power-on/ off |
| Button b | Volume adjustment | Power-on/ off | Volume adjustment | Power-on/off | Volume adjustment |

In addition, a mapping relationship between a function that needs to be responded to by each button in the button group on the mobile phone 100 and a rotation angle may alternatively be preset, as shown in Table 6. In Table 6, buttons in the button group include a button a, a button b, and a button c. When the rotation angle is 0°, a function that needs to be responded to by the button a is power-on/off, a function that needs to be responded to by the button b is volume increase, and a function that needs to be responded to by the button c is volume decrease. When the rotation angle is 90°, a function that needs to be responded to by the button a is volume increase, a function that needs to be responded to by the button b is power-on/off, and a function that needs to be responded to by the button c is volume decrease. When the rotation angle is 180°, a function that needs to be responded to by the button a is volume increase, a function that needs to be responded to by the button b is power on/off, and a function that needs to be responded to by the button c is volume decrease. When the rotation angle is 270°, a function that needs to be responded to by the button a is power-on/off, a function that needs to be responded to by the button b is volume decrease, and a function that needs to be responded to by the button c is volume increase. When the rotation angle is 360°, a function that needs to be responded to by the button a is power-on/off, a function that needs to be responded to by the button b is volume increase, and a function that needs to be responded to by the button c is volume decrease. Therefore, when the button event is obtained, if the rotation angle of the mobile phone 100 is 90°, the function that needs to be responded to by the button a in the button group on the mobile phone 100 is volume increase, the function that needs to be responded to by the button b is power-on/off, and the function that needs to be responded to by the button c is volume decrease.

TABLE 6

| Button | Rotation angle | | | | |
| | 0° | 90° | 180° | 270° | 360° |
| | Button function | | | | |
|---|---|---|---|---|---|
| Button a | Power-on/off | Volume increase | Volume increase | Power-on/off | Power-on/off |
| Button b | Volume increase | Power-on/off | Power-on/off | Volume decrease | Volume increase |
| Button c | Volume decrease | Volume decrease | Volume decrease | Volume increase | Volume decrease |

It may be understood that the rotation angles in Table 5 and Table 6 are merely examples for description, and may be specifically adjusted depending on an actual situation. This is not limited herein.

S1203: Respond to the button event by using the determined target function.

Specifically, when the target function that needs to be responded to by each button in the button group on the mobile phone 100 is determined, the target function may be used to respond to the button event. For example, still refer to Table 5. If the currently determined target function that needs to be responded to by each button in the button group on the mobile phone 100 is: the function that needs to be responded to by the button a is volume adjustment, and the function that needs to be responded to by the button b is power-on/off, in the button event, a function corresponding to volume adjustment is performed if the user triggers the button a, or a function corresponding to power-on/off is performed if the user triggers the button b. For example, the button a may be referred to as a third button, and the function that needs to be responded to by the button a may be a fifth function. When the third button is triggered, the fifth function may be output. For example, the third button and the first button described above may be a same button. In this case, the fifth function is the same as the first function or the second function described above.

Figure 13A:
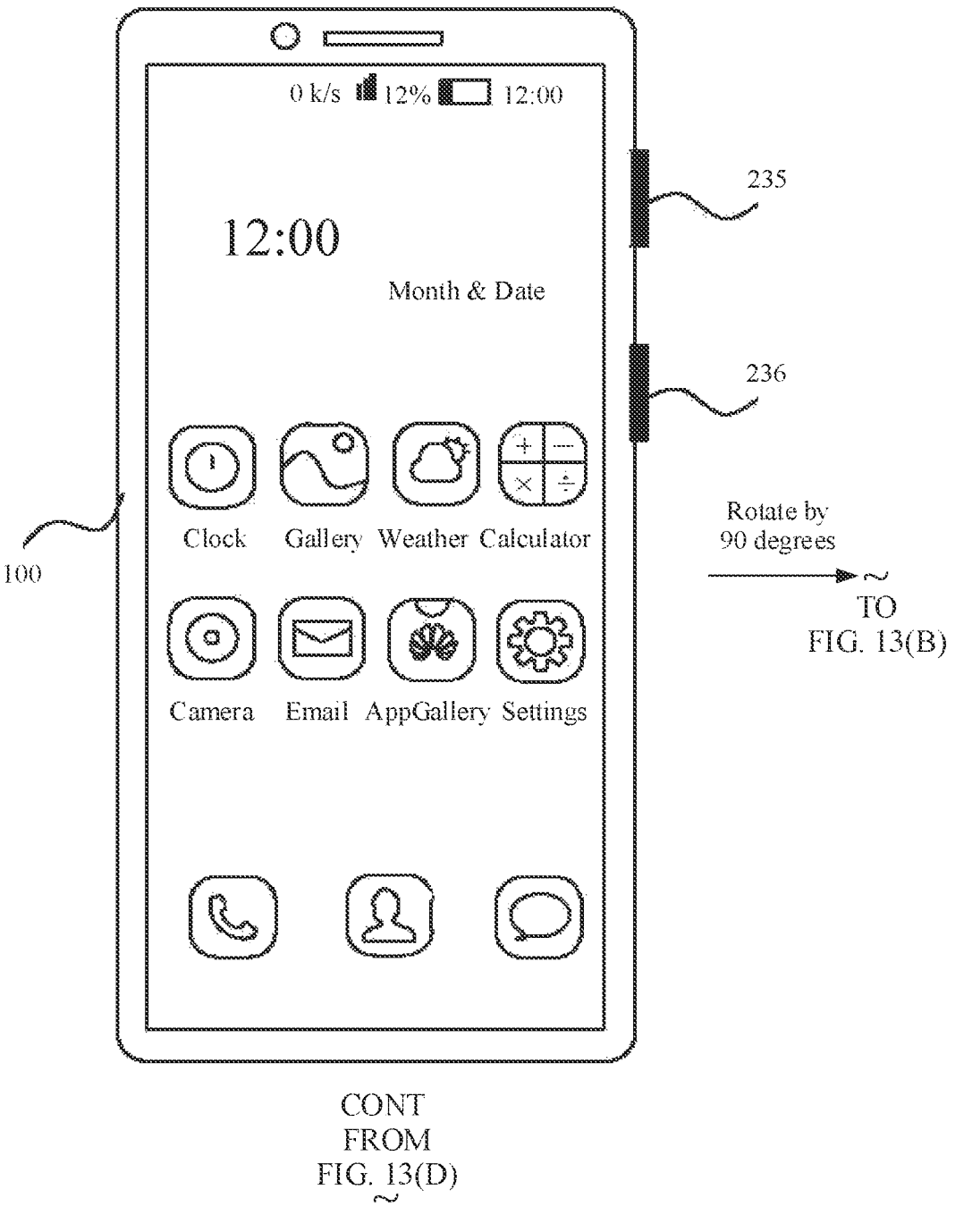
FIG. 13(A) to FIG. 13(D) are a schematic diagram of changes in a mobile phone rotation process according to an embodiment of this application.
Figures 13A, 13B, 13C:
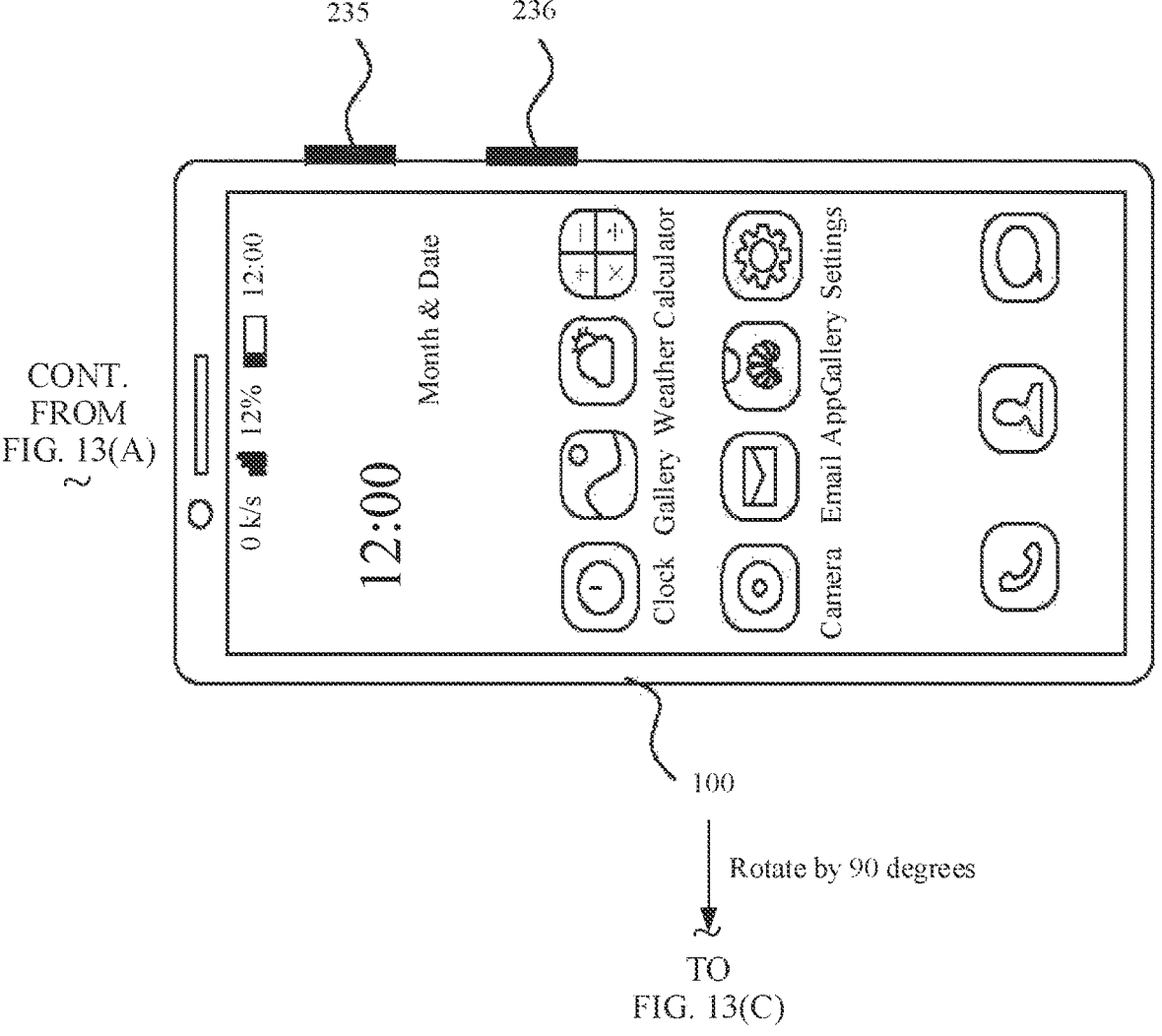
Figure 13C:
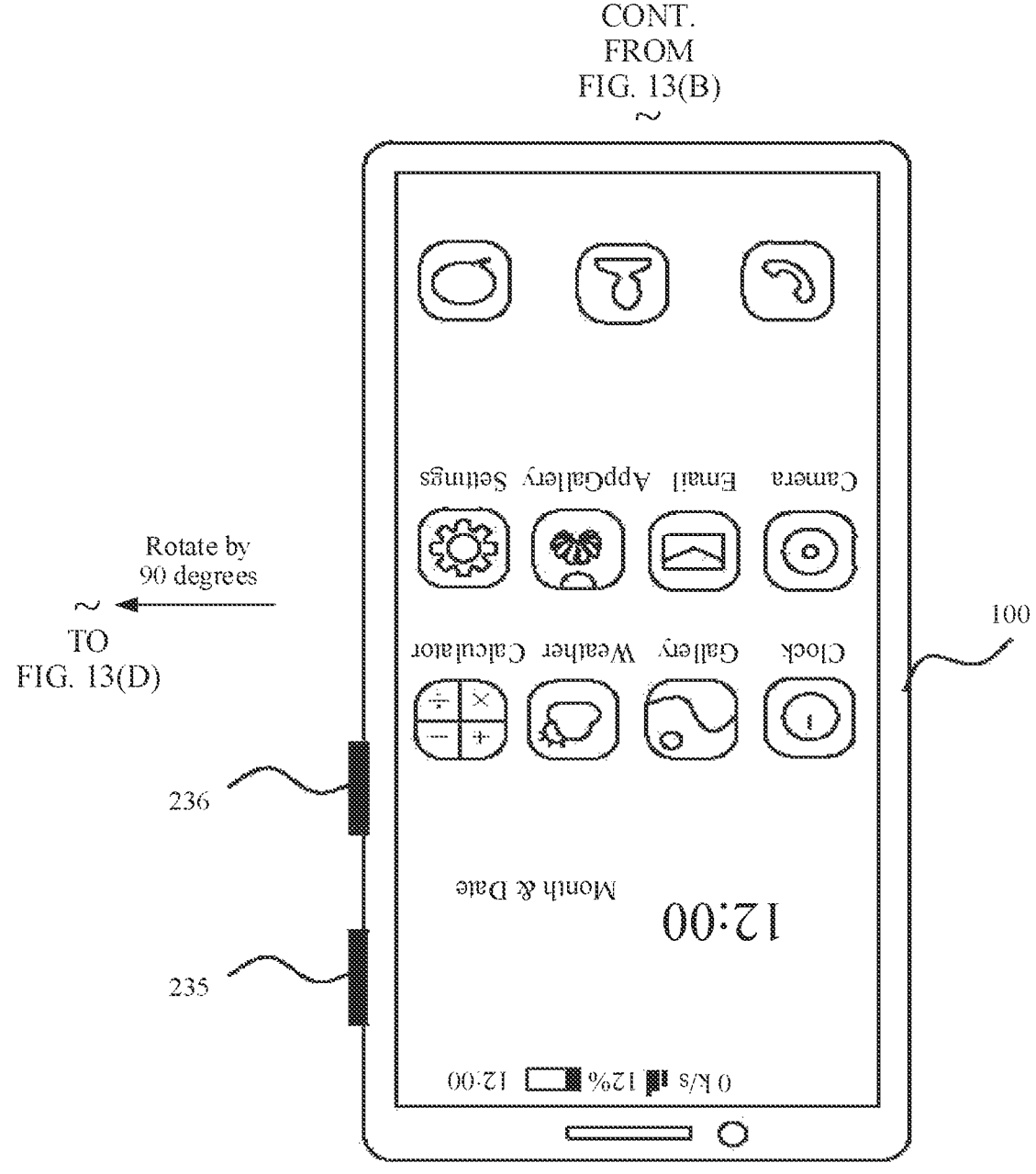
Figures 13A, 13D:
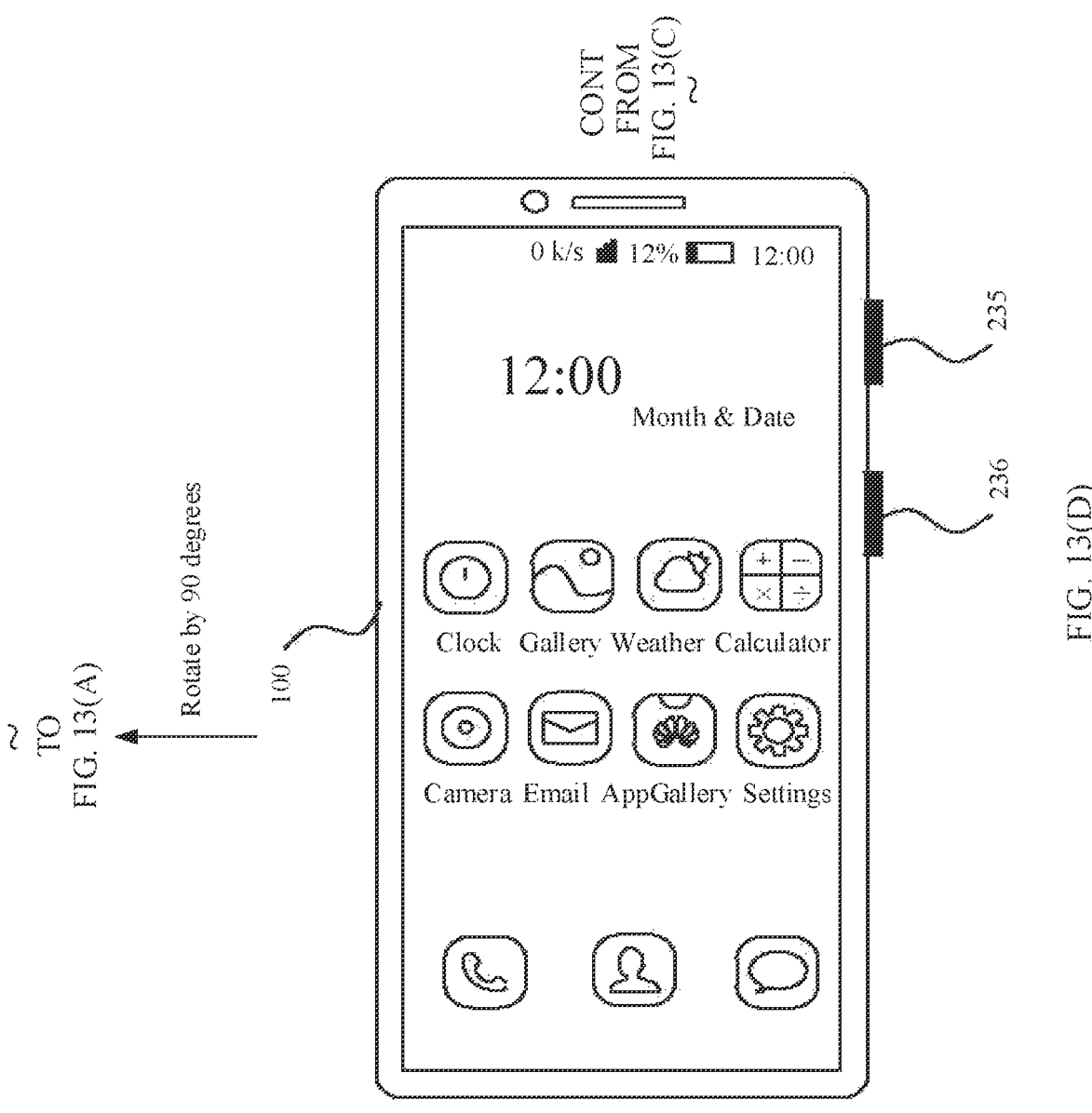

For example, if it is predefined in the mobile phone 100 that when the mobile phone is not rotated and the mobile phone is in a normal use state, and the physical form of the foldable screen of the mobile phone 100 is the unfolded state (namely, a state shown in FIG. 13(A), in this case, a status bar of the mobile phone 100 is located at the top of the screen of the mobile phone 100, and the state may be understood as the reference state described above), a function of a button 235 is volume adjustment, and a function of a button 236 is power-on/off, the mobile phone 100 may respond to the function of volume adjustment when the user triggers the button 235; or the mobile phone 100 may respond to the function of power-on/off when the user triggers the button 236. After the user controls the mobile phone 100 to rotate anticlockwise by 90 degrees, the mobile phone 100 is switched to a state shown in FIG. 13(B) from the state shown in FIG. 13(A). In the state shown in FIG. 13(B), the function of the button 235 is power-on/off, and the function of the button 236 is volume adjustment. In this case, when the user triggers the button 236, the mobile phone 100 may respond to the function of volume adjustment. In the state shown in FIG. 13(B), after the user continues to control the mobile phone 100 to rotate counterclockwise by 90 degrees, the mobile phone 100 is switched to a state shown in FIG. 13(C) from the state shown in FIG. 13(B). In the state shown in FIG. 13(C), the function of the button 235 is power-on/off, and the function of the button 236 is volume adjustment. In this case, when the user triggers the button 236, the mobile phone 100 may respond to the function of volume adjustment. In the state shown in FIG. 13(C), after the user continues to control the mobile phone 100 to rotate counterclockwise by 90 degrees, the mobile phone 100 is switched to a state shown in FIG. 13(D) from the state shown in FIG. 13(C). In the state shown in FIG. 13(D), the function of the button 235 is power-on/off, and the function of the button 236 is volume adjustment. In this case, when the user triggers the button 236, the mobile phone 100 may respond to the function of volume adjustment. In the state shown in FIG. 13(D), after the user continues to control the mobile phone 100 to rotate the counter-clockwise by 90 degrees, the mobile phone 100 is switched to the state shown in FIG. 13(A) from the state shown in FIG. 13(D). It may be understood that in FIG. 13(A) to FIG. 13(D), when the physical form of the foldable screen of the mobile phone 100 is the folded state, functions of the buttons on the mobile phone 100 may also be adaptively adjusted based on a rotation angle. A process of the adjustment is similar to that performed when the physical form of the foldable screen of the mobile phone 100 shown in FIG. 13(A) to FIG. 13(D) is the unfolded state, and details are not described herein again.

It may be understood that S1202 may alternatively be replaced with "determine, based on the rotation angle, a target function that needs to be responded to by each button in a button group on the mobile phone 100, where the button group includes at least one button, and target functions that need to be responded to by each button in the button group and that correspond to different rotation angles are different". In addition, S1203 may be replaced with "when a button event is obtained, respond to the button event by using the determined target function". To be specific, after the rotation angle is determined, a function of each button may be first determined based on the rotation angle. Then, when a button is triggered, a determined function of the button may be used to respond to the button event, that is, the function of the button is output. For example, if the currently determined rotation angle is 90°, and a function of the button a is volume decrease, volume decrease may be output when the button a is triggered, that is, a volume of output audio of the mobile phone 100 is reduced.

It may be understood that after the mobile phone 100 is rotated, landscape/portrait mode switching is performed on the mobile phone 100 generally, and locations of buttons on the mobile phone 100 also change correspondingly. Therefore, when the mobile phone 100 is rotated, the function that needs to be responded to by each button in the button group on the electronic device is adaptively adjusted based on the rotation angle, so that a button function that meets a using habit of the user can still be provided when the electronic device is rotated, thereby improving user experience.

It may be understood that in embodiments of this application, the mobile phone 100 may adaptively adjust a function of a button on the mobile phone 100 based on any two or three of the physical form of the foldable screen of the mobile phone 100, the holding posture with which the user holds the mobile phone 100, or the rotation angle of the mobile phone 100. A specific adjustment process may be obtained by combining the foregoing embodiments. Details are not described herein again.

It may be understood that all or some of features in embodiments of this application may be freely combined without a conflict. The combined technical solutions also fall within the scope of this application. In addition, an execution sequence of the steps in any embodiment of this application may be adjusted depending on an actual situation without a conflict, and an adjusted technical solution also falls within the scope of this application.

Figure 14:
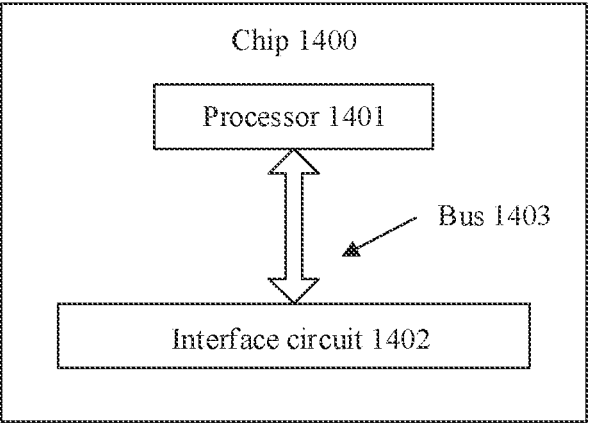
FIG. 14 is a schematic diagram of a structure of a chip according to an embodiment of this application.

According to the methods in the foregoing embodiments, an embodiment of this application further provides a chip. FIG. 14 is a schematic diagram of a structure of a chip according to an embodiment of this application. As shown in FIG. 14, a chip 1400 includes one or more processors 1401 and an interface circuit 1402. Optionally, the chip 1400 may further include a bus 1403. Herein, details are as follows.

The processor 1401 may be an integrated circuit chip, and has a signal processing capability. In an implementation process, the steps of the foregoing method may be completed by using a hardware integrated logic circuit in the processor 1401, or by using instructions in a form of software. The processor 1401 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods and steps that are disclosed in embodiments of this application. The general-purpose processor may be a microprocessor, or the processor may be any conventional processor or the like. The interface circuit 1402 may send or receive data, instructions, or information. The processor 1401 may process the data, the instructions, or other information received through the interface circuit 1402, and send, through the interface circuit 1402, information obtained after processing.

Optionally, the chip further includes a memory. The memory may include a read-only memory and a random access memory, and provide operation instructions and data for the processor. A part of the memory may further include a non-volatile random access memory (NVRAM). Optionally, the memory stores an executable software module or a data structure, and the processor may perform a corresponding operation by invoking operation instructions (the operation instructions may be stored in an operating system) stored in the memory.

Optionally, the interface circuit 1402 may be configured to output an execution result of the processor 1401.

It should be noted that functions corresponding to each of the processor 1401 and the interface circuit 1402 may be implemented by using a hardware design, may be implemented by using a software design, or may be implemented by using a combination of software and hardware. This is not limited herein.

It should be understood that the steps in the foregoing method embodiments may be completed by using a logic circuit in a form of hardware or instructions in a form of software in the processor. The chip may be applied to the foregoing electronic device (for example, the mobile phone 100), to implement the methods provided in embodiments of this application.

It may be understood that, the processor in embodiments of this application may be a central processing unit (central processing unit, CPU), may be another general-purpose processor, a digital signal processor (digital signal processor, DSP), an application-specific integrated circuit (application-specific integrated circuit, ASIC), a field programmable gate array (field programmable gate array, FPGA), another programmable logic device, a transistor logic device, a hardware component, or any combination thereof. The general-purpose processor may be a microprocessor, or may be any conventional processor.

The method steps in embodiments of this application may be implemented in a hardware manner, or may be implemented in a manner of executing software instructions by the processor. The software instructions may include corresponding software modules. The software modules may be stored in a random access memory (random access memory, RAM), a flash memory, a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC.

All or some of the foregoing embodiments may be implemented by software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose processor, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

It may be understood that various numbers in embodiments of this application are merely used for differentiation for ease of description, and are not used to limit the scope of embodiments of this application.

What is claimed is:

1. A method comprising:

making a first determination that a first button of an electronic device has been triggered;

making a second determination of whether a foldable display screen of the electronic device is in a folded state or an unfolded state;

outputting a first function or a second function based on the first determination and the second determination;

detecting that the electronic device is rotated around a z-axis;

determining, after detecting that the electronic device is rotated around the z-axis, a third function of a second button of the electronic device based on a rotation angle of the electronic device relative to a reference state of the electronic device on a first plane on which an x-axis and a y-axis are located, wherein the z-axis is perpendicular to the foldable display screen, wherein the x-axis is parallel to a side part of the electronic device, wherein the y-axis is perpendicular to a second plane on which the x-axis and the z-axis are located, and wherein the reference state is when a lower side edge of the electronic device is parallel to a horizontal plane and a first distance between an upper side edge of the electronic device and the horizontal plane is greater than or equal to a second distance between the lower side edge and the horizontal plane; and outputting the third function when the second button is triggered.

2. The method of claim 1, further comprising:

making a third determination that a third button of the electronic device has been triggered;

outputting, based on the first determination and the third determination, the second function when the foldable display screen is in the folded state; and outputting, based on the first determination and the third determination, the first function when the foldable display screen is in the unfolded state.

3. The method of claim 2, wherein the first function is power-on/off and the second function is volume adjustment.

4. The method of claim 1, further comprising:

obtaining a folding angle of the foldable display screen; and determining, based on the folding angle, whether the foldable display screen is in the folded state or the unfolded state.

5. The method of claim 4, wherein determining whether the foldable display screen is in the folded state or the unfolded state comprises:

determining, when the folding angle is greater than a first preset angle, that the foldable display screen is the unfolded state; and determining, when the folding angle is less than or equal to a second preset angle, that the foldable display screen is the folded state.

6. The method of claim 1, wherein the second button is the same as the first button, and wherein the third function is the same as the first function or the second function.

7. The method of claim 1, further comprising:

outputting, when a holding posture of the electronic device is left-hand holding and a fourth button of the electronic device is triggered, a fourth function; and outputting, when the holding posture is right-hand holding and the fourth button is triggered, a fifth function.

8. The method of claim 7, wherein the fourth button is the same as the first button.

9. The method of claim 8, wherein the fourth function is the same as the first function or the second function, wherein the fifth function is the same as the first function or the second function, and wherein the fourth function is different from the fifth function.

10. An electronic device, comprising:

a first button;

a second button;

a foldable display screen;

at least one memory configured to store a program; and at least one processor coupled to the at least one memory, the first button, the second button, and the foldable display screen, wherein the at least one processor is configured to execute the program to cause the electronic device to:

output, when the foldable display screen is in a folded state and the first button of the electronic device is triggered, a first function;

output, when the foldable display screen is in an unfolded state and the first button is triggered, a second function;

detect that the electronic device is rotated around a z-axis;

determine, after detecting that the electronic device is rotated around the z-axis, a third function of the second button based on a rotation angle of the electronic device relative to a reference state of the electronic device on a first plane on which an x-axis and a y-axis are located, wherein the z-axis is perpendicular to the foldable display screen, wherein the x-axis is parallel to a side part of the electronic device, wherein the y-axis is perpendicular to a second plane on which the x-axis and the z-axis are located, and wherein the reference state is when a lower side edge of the electronic device is parallel to a horizontal plane and a first distance between an upper side edge of the electronic device and the horizontal plane is greater than or equal to a second distance between the lower side edge and the horizontal plane; and output the third function when the second button is triggered.

11. The electronic device of claim 10, further comprising a third button coupled to the at least one processor, wherein the at least one processor is further configured to execute the program to cause the electronic device to:

output, when the foldable display screen is in the folded state and the third button is triggered, the second function; and output, when the foldable display screen is in the unfolded state and the third button is in the unfolded state, the first function.

12. The electronic device of claim 11, wherein the first function is power-on/off and the second function is volume adjustment.

13. The electronic device of claim 11, wherein the foldable display screen comprises an inner screen and an outer screen, the inner screen comprises a first screen and a second screen, the outer screen is located on a first body of the electronic device, the first screen is located on the first body, and the second screen is located on a second body of the electronic device, and wherein both the first button and the third button are disposed on the first body.

14. The electronic device of claim 13, wherein both the first button and the third button are located on a first side of the first body.

15. The electronic device of claim 10, wherein the at least one processor is further configured to execute the program to cause the electronic device to:

obtain a folding angle of the foldable display screen; and determine, based on the folding angle, whether the foldable display screen is in the folded state or the unfolded state.

16. The electronic device of claim 15, wherein the at least one processor is further configured to execute the program to cause the electronic device to determine whether the foldable display screen is in the folded state or the unfolded state by:

determining, when the folding angle is greater than a first preset angle, that the foldable display screen is the unfolded state; and determining, when the folding angle is less than or equal to a second preset angle, that the foldable display screen is the folded state.

17. The electronic device of claim 10, further comprising a fourth button coupled to the at least one processor, wherein the at least one processor is further configured to execute the program to cause the electronic device to:

output, when a holding posture of the electronic device is left-hand holding and the fourth button is triggered, a fourth function; and output, when the holding posture is right-hand holding and the fourth button is triggered, a fifth function.

18. The electronic device of claim 17, wherein the fourth button is the same as the first button, wherein the fourth function is the same as the first function or the second function, wherein the fifth function is the same as the first function or the second function, and wherein the fourth function is different from the fifth function.

* * * * *